United States Patent [19]

Pepe et al.

[11] Patent Number: 5,742,668
[45] Date of Patent: Apr. 21, 1998

[54] ELECTRONIC MASSAGING NETWORK

[75] Inventors: David Matthew Pepe, Middletown; Lisa B. Blitzer, Manalapan; James Joseph Brockman, Perrineville; William Cruz, Eatontown; Dwight Omar Hakim, Matawan, all of N.J.; Michael Kramer, Bronx County, N.Y.; Dawn Diane Petr, Basking Ridge, N.J.; Josefa Ramaroson, Freehold, N.J.; Gerardo Ramirez, Bridgewater, N.J.; Yang-Wei Wang, Howell, N.J.; Robert G. White, Morristown, N.J.

[73] Assignee: Bell Communications Research, Inc., Morristown, N.J.

[21] Appl. No.: 466,623

[22] Filed: Jun. 6, 1995

Related U.S. Application Data

[63] Continuation of Ser. No. 309,336, Sep. 14, 1994.
[51] Int. Cl.[6] .................. H04M 11/00; H04M 1/64
[52] U.S. Cl. ..................... 379/58; 379/67; 379/57
[58] Field of Search ........................ 379/58, 59, 60, 379/57, 93, 67; 370/58.1, 110.1

[56] References Cited

U.S. PATENT DOCUMENTS

| | | | |
|---|---|---|---|
| 5,008,926 | 4/1991 | Misholi | 379/89 |
| 5,168,271 | 12/1992 | Hoff | 379/60 X |
| 5,311,576 | 5/1994 | Brunson et al. | 379/89 |
| 5,325,419 | 6/1994 | Connolly et al. | 379/60 |
| 5,329,579 | 7/1994 | Brunson | 379/88 |
| 5,351,235 | 9/1994 | Lahtinen | 370/58.1 |
| 5,384,831 | 1/1995 | Cresswell | 379/67 |
| 5,418,835 | 5/1995 | Frohman et al. | 379/57 |
| 5,420,911 | 5/1995 | Dahlin et al. | 379/59 |
| 5,452,289 | 9/1995 | Sharma et al. | 370/32.1 |
| 5,479,411 | 12/1995 | Klein | 370/110.1 |
| 5,604,788 | 2/1997 | Tett | 379/58 |

*Primary Examiner*—Dwayne Bost
*Assistant Examiner*—Scott Richardson
*Attorney, Agent, or Firm*—Loria B. Yeadon; Joseph Giordano

[57] ABSTRACT

A personal communications internetwork provides a personal communications internetwork providing a network subscriber with the ability to remotely control the receipt and delivery of wireless and wireline electronic text messages. The network operates as an interface between wireless and wireline networks. The subscriber's message receipt and delivery options are maintained in a database which the subscriber may access by wireless or wireline communications to update the options programmed in the database.

3 Claims, 21 Drawing Sheets

ELECTRONIC MASSAGING NETWORK

RELATED CASE INFORMATION

This case is a continuation application of U.S. patent application Ser. No. 08/309,336 filed on Sep. 19, 1994. The contents of that application are incorporated herein by reference.

FIELD OF THE INVENTION

The present invention is directed to an internetwork for personal communications and, more particularly, to a network which provides a variety of electronic text delivery, receipt, and notification options.

BACKGROUND OF THE INVENTION

The use of messaging as a means of day-to-day communications continues to grow and evolve, particularly in a business context. Messaging includes electronic mail (e-mail), facsimile transmissions (fax), paging, voice mail, and telephone communications. The introduction of the cellular phone and other wireless communications facilitated the advent of the "mobile office". The mobile office allows an employee, for example, to work away from the office on a portable computer and be in constant touch with the office via a cellular phone.

The messaging options described above are available to businesses of all sizes, as well as individual users, from a variety of service providers. Many offices have some or all of the messaging options described above. The office may have certain messaging equipment (referred to as "consumer premises equipment" or "CPE") connected to one or more wireline networks. That is, the office may have telephones, fax servers, and voice mail systems connected to phone lines, and computers having modems for e-mail connected to packet networks which are connected via phone lines. The mobile employee may have certain wireless messaging equipment, such as a pager, a cellular telephone, or a personal digital assistant ("PDA"), which is typically a notebook computer connected to a wireless communication network.

One important goal of personal communication services is to allow users to communicate from anywhere to anywhere at any time. Such personal communication services generally involve multiple service providers including local and long distance telephone companies and cellular telephone companies. An example of a personal communication service is as follows:

A personal communication service provider (e.g., a cellular telephone company) enables traveling users to rent a wireless portable phone from a rental phone company (e.g., from an airline or car rental company). Using the rental phone, the user is provided with basic mobile phone service from the personal communication service provider. In addition, the user would like the following features:

1) The user wants calls directed to his/her office or home to be automatically forwarded to the rental portable phone, without informing anyone that he/she is traveling.

2) To avoid unimportant incoming calls (and corresponding incoming call charges), the user would like to restrict the number of people who can call the rented portable phone.

3) It is important to the user that the rental phone features be activated instantly, so that calls can be made immediately upon the user's arrival at the visiting location.

This kind of personal communication service involves a plurality of service providers. These providers are (a) the local telephone company at the home location, (b) a long distance telephone company, (c) the local telephone company at the visiting location, and (d) the personal communication service provider (i.e., the cellular telephone company) at the visiting location. All of these are referred to herein as "service providers".

To enable this kind of personal communication service, involving multiple service providers, interoperability problems among the different service providers must be resolved. The interoperability problems can be divided into two categories: (a) location tracking and (b) service management.

The interoperability problem for location tracking has been addressed by adopting signaling protocols used by the mobile phone industry. Location tracking functions are implemented using two location registers. One of the registers, maintained by the local telephone company of the user's home location, is called the Home Location Register (HLR). The other register, maintained by the local telephone company of the visiting location, is called the Visiting Location Register (VLR). The HLR stores customer profile data and the location of the VLR of the user. The customer profile data contains important information such as the user's name, address, preferred long distance carrier, service features (e.g., call forwarding and call restriction), billing, and other administrative related information. When the user travels to a new visiting location, a new VLR is created in the new location. A part of the profile data stored in the HLR is transmitted and loaded into the VLR such that the service provider at the visiting location can implement service features for the visiting user. When the user travels to a new visiting location the location of the VLR stored in the HLR is changed to the new VLR location, and the VLR in the previously visited location is deleted. The process of creating a new VLR, loading profile data to the VLR, and updating the visiting location of a user in the HLR is called "automatic roamer registration".

The interoperability problem for service management is much more complex than that for location tracking. Service management refers to a collection of functions required to enable a personal communication service user to subscribe to, modify, and activate service features anywhere and at any time. Examples of service management functions include phone number administration, customer profile data management, service activation, and security administration. The phone number administration function is important for maintaining the uniqueness of phone numbers. The customer profile data management function provides customer profile databases and user interfaces for creating, modifying, or transferring such databases. The service activation function extracts part of the data specifying service features from the profile data and loads this data into physical communication systems that process calls. The service activation function also controls the activation and deactivation of the service features. The security administration function prevents or detects unauthorized uses of services and service management functions.

Service management functions of this type are needed to provide personal communication services involving multiple service providers. Such service management functions generally require interactions between application software and various databases owned and operated by the different service providers. Consider an application which enables a nomadic user to subscribe to a personal communication service from any service provider at any location. An example of such a service is call forwarding to a temporarily rented portable phone. The application may, for example, need to perform the following database access operations at databases maintained by various different service providers:

- check credit databases owned by credit card companies or phone companies to determine whether the user is able to pay for the service;
- check the customer profile database in the user's HLR to determine whether the user is currently located in a place other than the visiting location currently stored in the HLR;
- check the credit and network databases of long distance phone companies specified by the user to determine whether the user can use a particular long distance carrier in the visiting location;
- load profile data into the VLR at the visiting location and update the HLR with the location of the VLR if necessary; and
- load the profile data to the call processing systems and activate the service.

The user may need to send or receive messages from any or all of the messaging options described above at a visiting location. That is, the user may want to receive or receive notification of e-mail, faxes, phone calls, or voice mail at a visiting location or to send e-mail or faxes from a wireless terminal. The need to integrate these various types of messaging options and to interconnect the many service providers has, until now, been largely unaddressed.

It is also desirable for the mobile employee to be able to limit the messages sent to the wireless messaging equipment, so that only urgent messages are received when away from the office and unwanted in-coming calls are avoided. The mobile employee may also wish to route certain incoming wireless messages and phone calls to other destinations, such as an office fax machine or a colleague's telephone.

Therefore, it is an object of the present invention to provide a mobile service subscriber the ability to remotely control the addressability, routing, accessibility, and delivery of messaging options.

It is another object of the present invention to provide an internetwork which interconnects messaging services with both wireless and wireline networks.

It is yet a further object of the invention to provide a control over the messages routed to wireless messaging options.

SUMMARY OF THE INVENTION

These objects are obtained by a personal communications internetwork providing a network subscriber with the ability to remotely control the receipt and delivery of wireless and wireline electronic text ("e-mail") messages. The network operates as an interface between wireless and wireline networks. The subscriber's message receipt and delivery options are maintained in a database which the subscriber may access by wireless or wireline communications to update the options programmed in the database.

BRIEF DESCRIPTION OF THE DRAWINGS

These and other objects and features of the invention will become apparent from the following drawings, wherein.

DETAILED DESCRIPTIONS OF PREFERRED EMBODIMENTS

For clarity of presentation, the detailed description is set out in the following subsections:

I. PCI Overview

The overall network is illustrated in FIGS. 1–4 The network is an interface between a plurality of wireless and wireline networks, providing a subscriber with a variety of wireless and wireline message and voice delivery and receipt options.

II. The PCI Server

Figure 5:
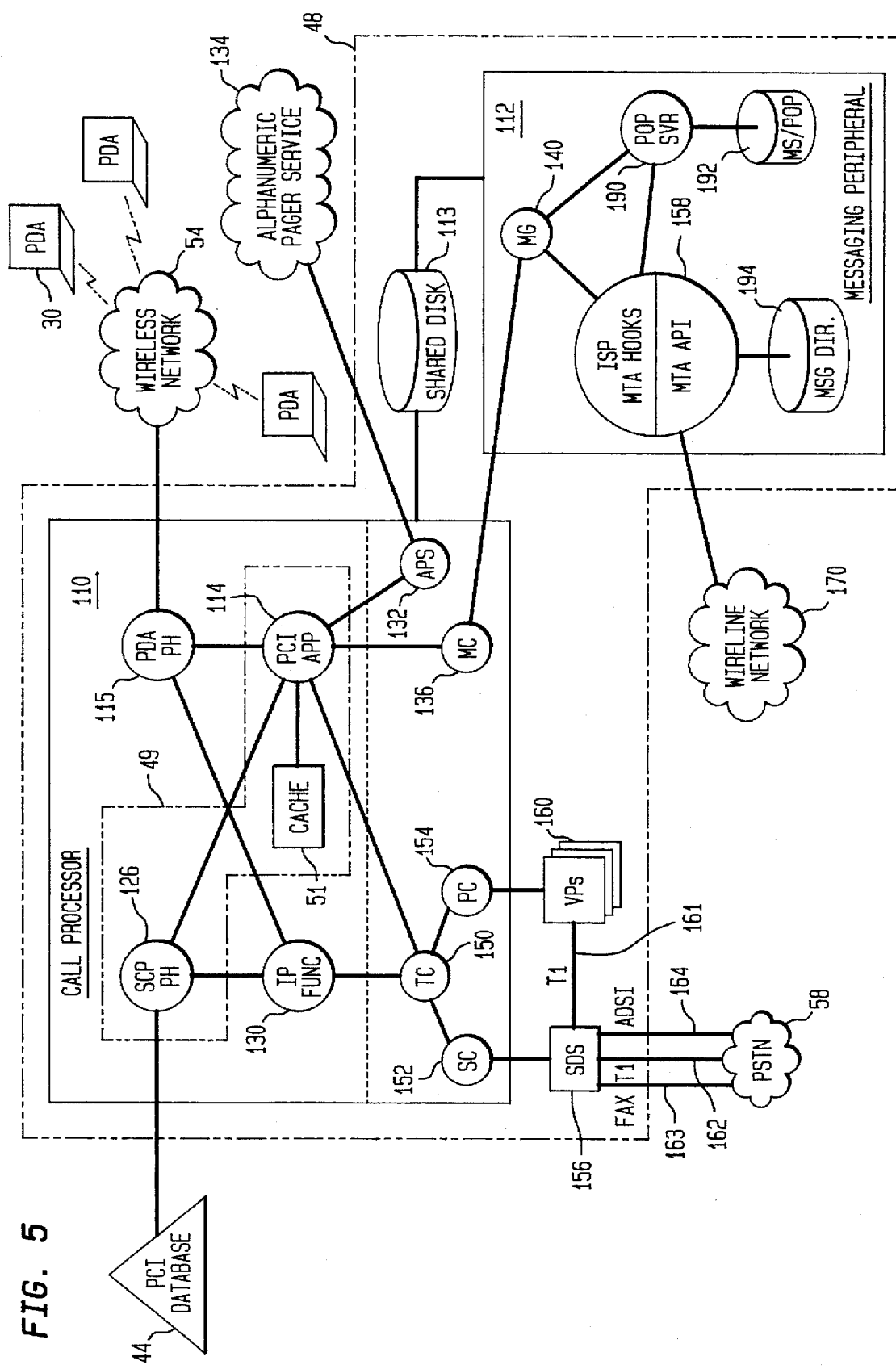
FIG. 5 is a block diagram of an exemplary PCI server according to the present invention.

The PCI Server is illustrated in FIG. 5. The PCI server is a peripheral which performs messaging and call redirection functions and interfaces with the PCI database to update the subscriber profile.

III. The PCI Database

Figure 6:
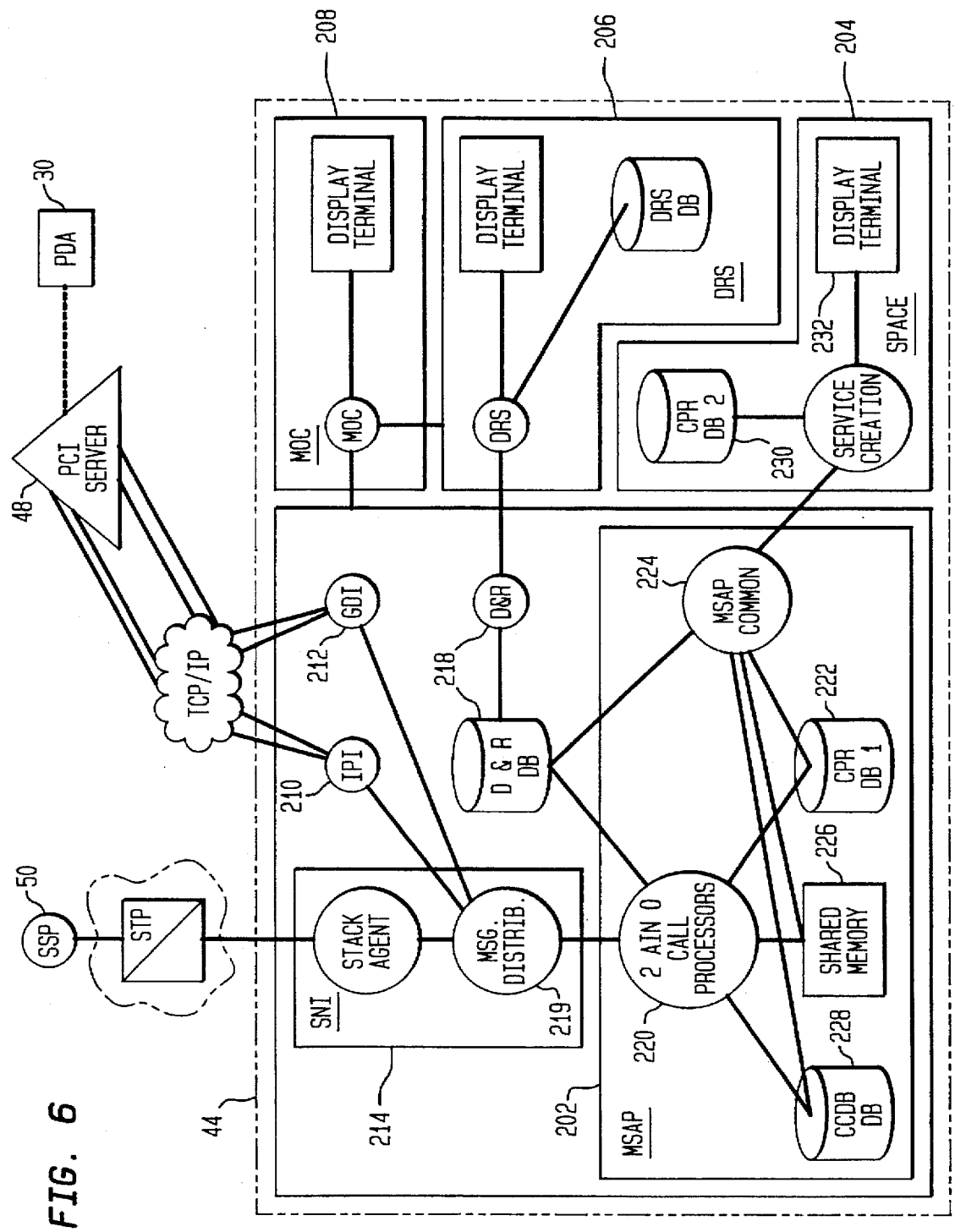
FIG. 6 is a block diagram of an exemplary embodiment of a PCI database according to the present invention.

The PCI Database is illustrated in FIG. 6. The PCI database maintains the subscriber profile, controls CallCommand functions, and handles DTMF-based subscriber profile updates.

IV. The Server/Database Interface

The Server/Database interface is illustrated in FIGS. 7–10. The PCI server/PCI database interface provides for the transfer of information regarding the subscriber profile.

V. The PDA/PCI Interface

The PDA/PCI interface is illustrated in FIGS. 11–18. The PDA/PCI interface provides for the transfer of information between a remote wireless subscriber and the PCI.

VI. E-mail Messaging Services

Figure 19:
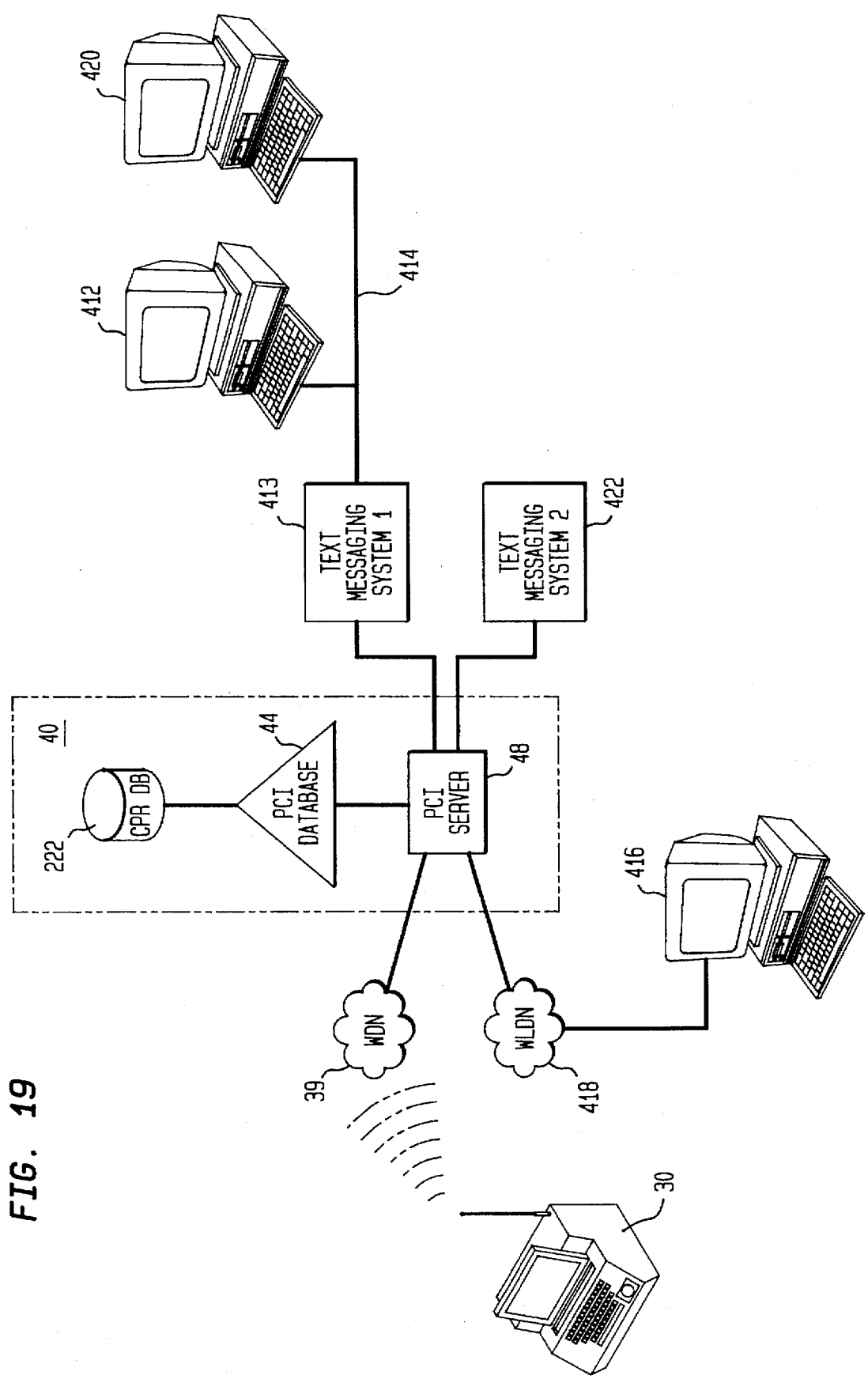
FIG. 19 is a block diagram of a text messaging portion of a PCI network.

E-mail messaging is the PCI in illustrated in FIG. 19. The PCI network provides the subscriber with a variety of e-mail delivery, receipt, and notification options, including screening and selective destination delivery of incoming e-mail.

VII. Message Flows

Figure 20:
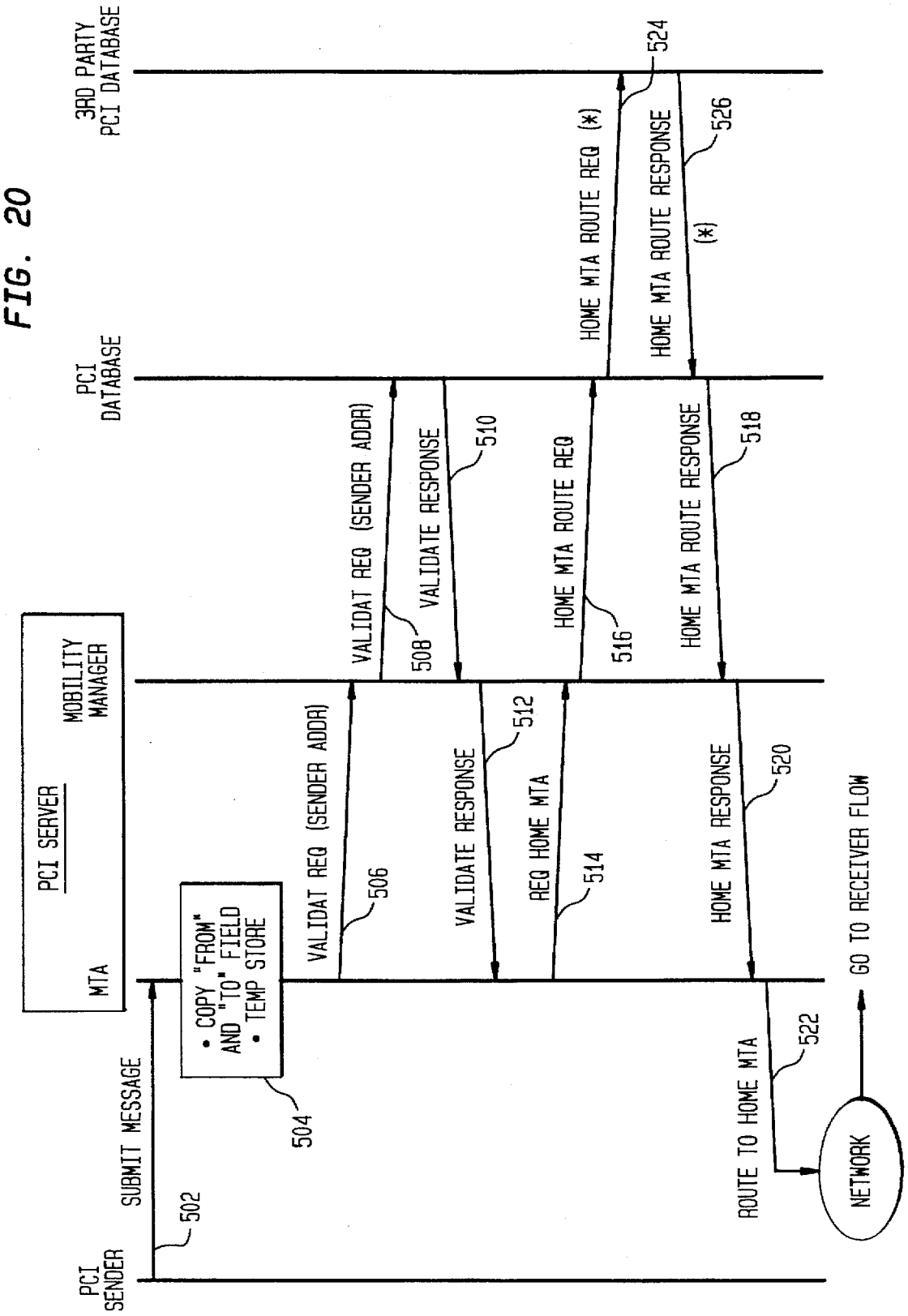
FIGS. 20, 21, and 22 illustrate exemplary message flows in the PCI network.
Figure 21:
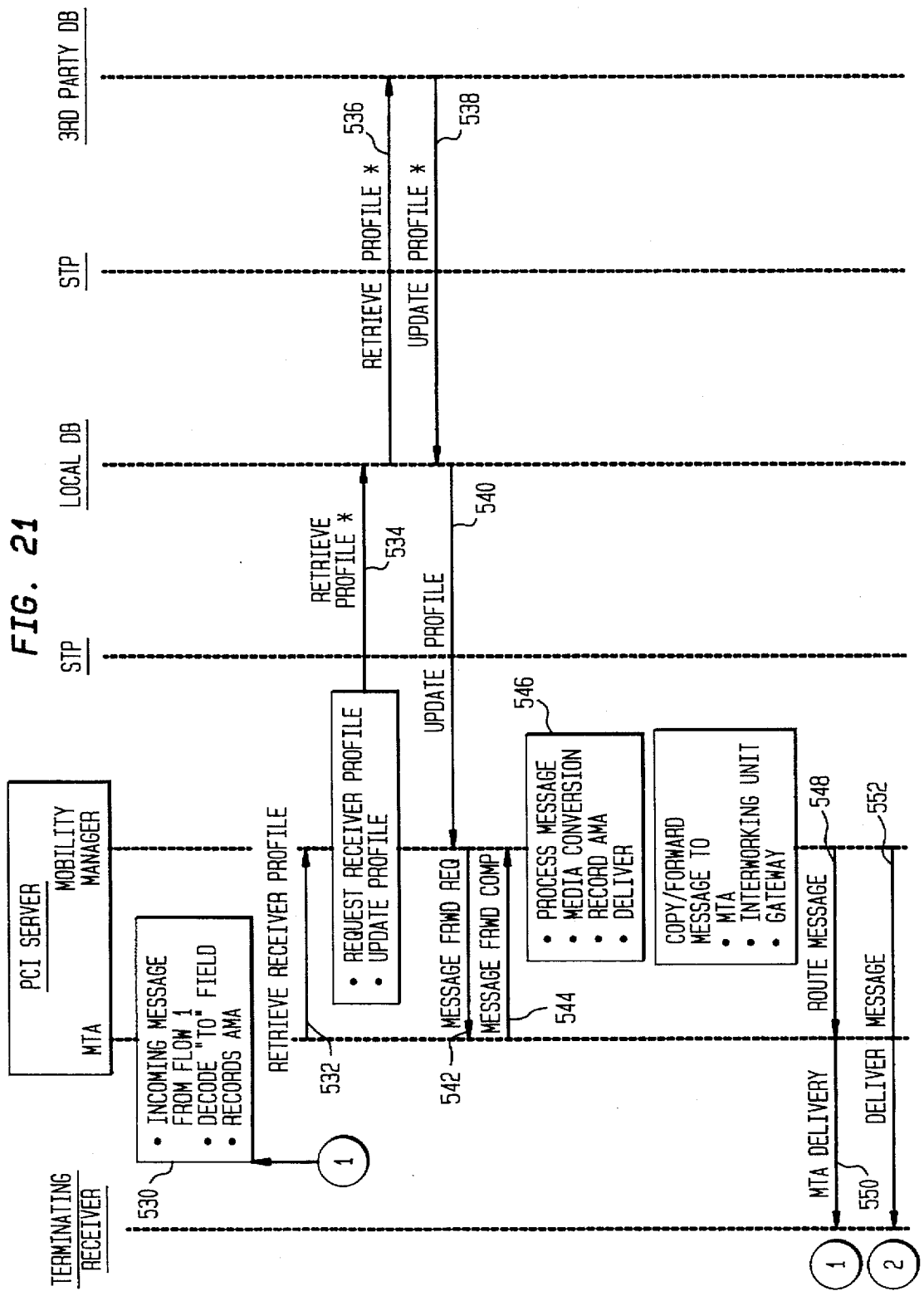
Figure 22:
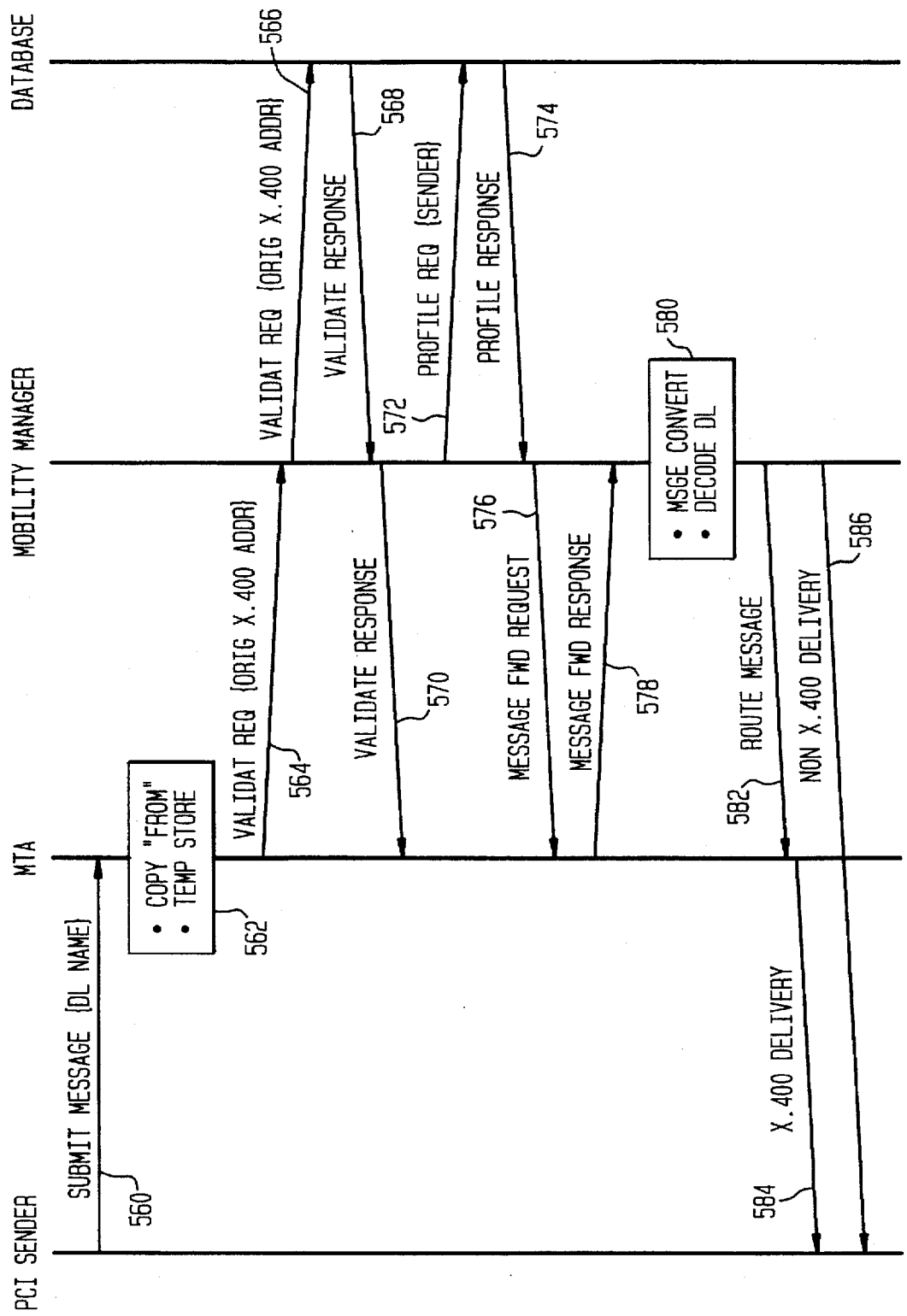

Certain message flows for wireless messaging in the PCI are illustrated in FIGS. 20–22. The three message flows illustrated are sending a message from one subscriber to another, receiving a message regardless of whether the subscriber is using a wireless or wireline terminal, and sending a message to a non-subscriber.

VIII. The PDA Application

The application residing in the PDA is described in FIGS. 23–30, which illustrate exemplary screens displayed to a PCI subscriber using a wireless PDA.

IX. Billing

Billing procedures for a PCI network use is briefly described.

X. Conclusion

A glossary of acronyms used in this specification is attached as Appendix A.

I. PCI Overview

Figure 1:
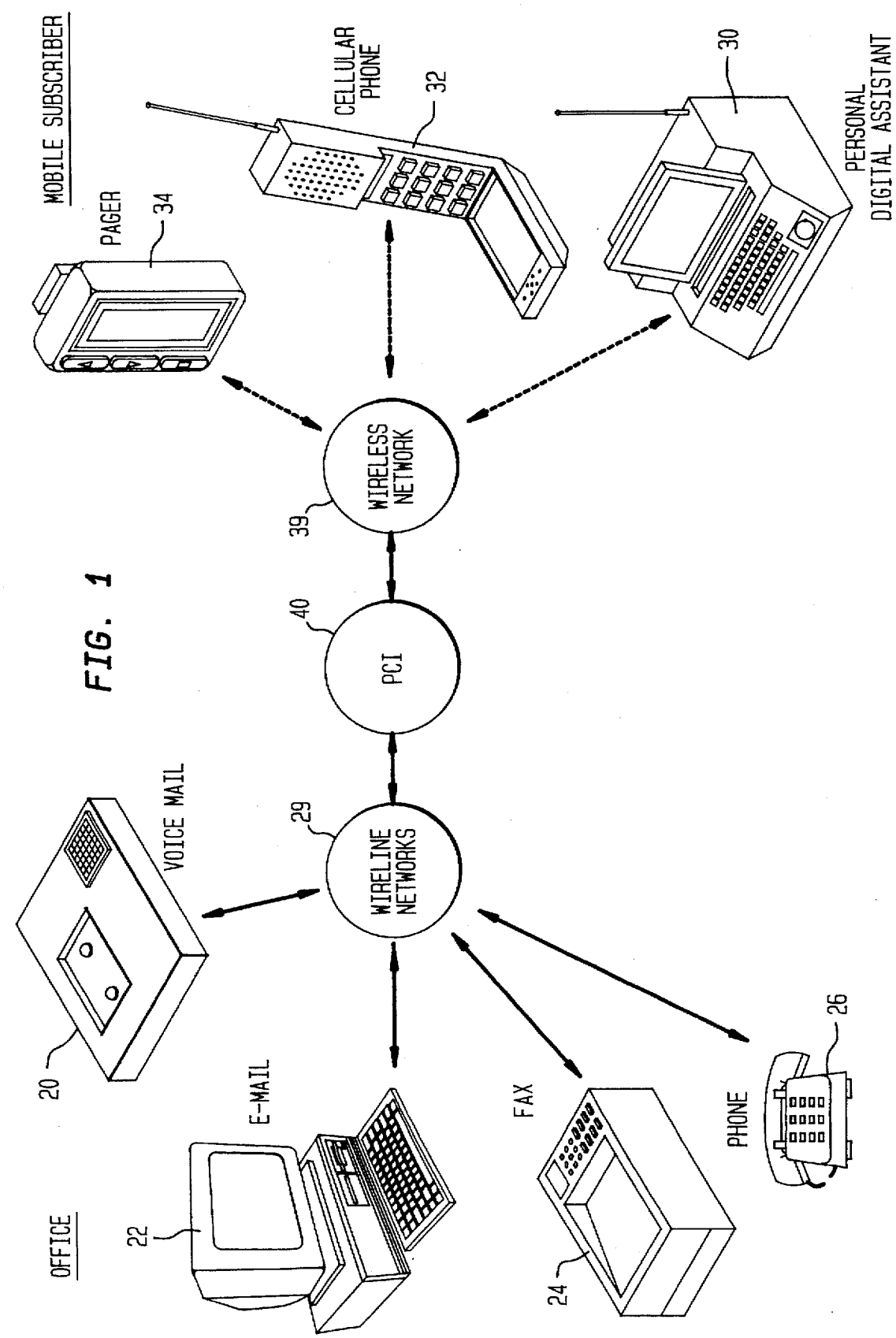
FIG. 1, 2, and 3 are overviews of the PCI networks.

FIG. 1 is a simplified overview of a personal communications internetworking ("PCI") according to the present invention. A consumer, an office for example, has various messaging equipment, such as a voice mail system 20, an e-mail terminal 22, fax machines 24, and telephones 26. These are all connected to wireline networks 29. For example, the e-mail terminal 22 may be connected to a data packet network, such as Internet, whose packets are carried over phone lines. The fax 24, phone 26, and voicemail system 20 may be connected to a Public Switched Telephone Network (PSTN), part of which belongs to a particular local phone service company, and part of which belongs to a particular long distance service provider.

A mobile communications subscriber (for example an employee who works at the office described above and travels frequently) has various portable messaging equipment, such as a PDA 30, a cellular phone 32, and a pager 34. These are connected to wireless networks 39. These wireless messaging options may be provided by different service providers. That is, the cellular phone may be connected to a wireless network of a cellular phone service provider, the pager may be connected to a different wireless network maintained by a pager service provider, and the PDA may be connected to a third wireless communications network maintained by yet another service provider.

A Personal Communications Internetworking ("PCI") 40 according to the present invention is connected between the wireless 39 and wireline networks 29. The PCI 40 permits the mobile communications subscriber to send and receive messages between disparate networks and messaging systems and a variety of service providers. The mobile communications subscriber can receive e-mail, fax, pages, and voice messages under a single phone number while using either a wireless or wireline network. The subscriber may also select the media format and serving network used to receive messages. The subscriber may also select cross-media notification of incoming messages, (i.e., the subscriber may receive notification from a pager message that a voice mail message was received).

The subscriber selects the wireline or wireless network and media format to be used for delivering messages or notification of message receipt. The PCI 40 will perform a media conversion to allow, for instance, an e-mail message to be delivered to a fax server. The PCI 40 may also include accessibility controls which allow the user to screen messages by selected criteria such as media type (e.g., e-mail, fax, etc.), message length (e.g., voice mail messages less than three minutes), or sender (e.g., only messages from the office and a certain client are to be forwarded).

For example, the subscriber may have notification of a voice mail or fax message receipt directed to a wireless PDA in the form of e-mail messages. If the subscriber's wireless PDA is not turned on or otherwise not operating, the notification may be routed to an alternate wireless or wireline network. Notification to the subscriber that a voice mail message was received may be, for example, rerouted to the subscriber's pager, and notification that a fax has been received may be rerouted to the wireline e-mail.

Figure 2:
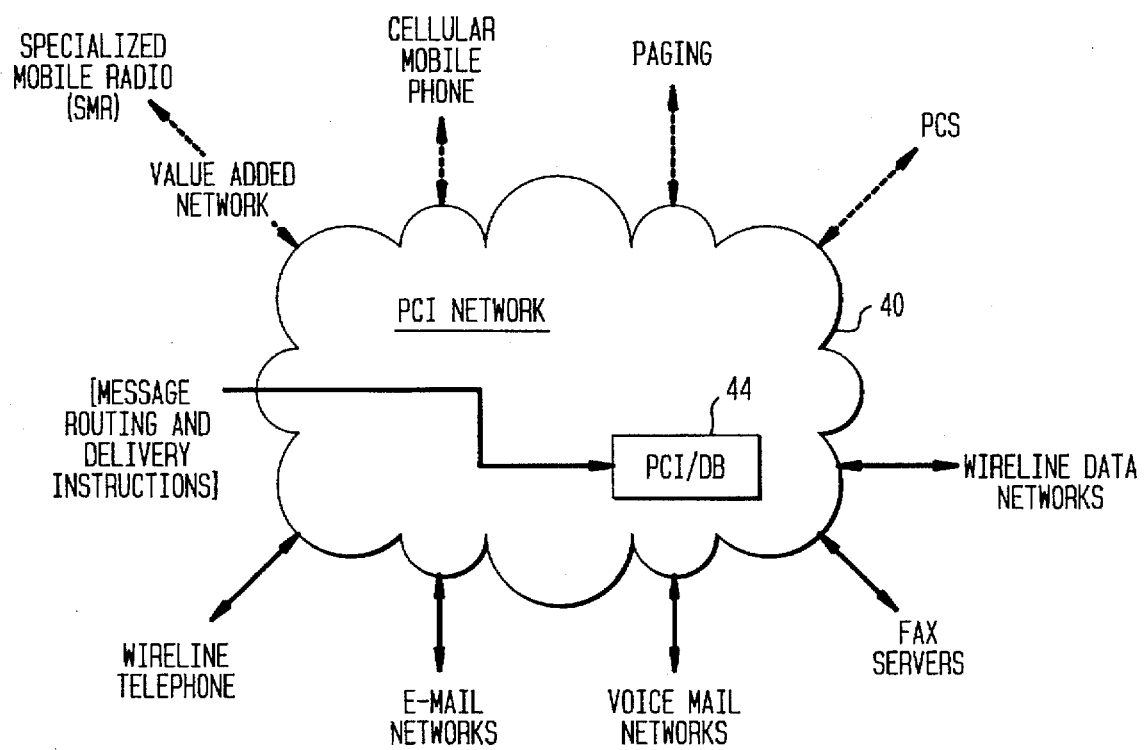

FIG. 2 is a simplified version of the interconnections between various messaging systems and a PCI. As shown in FIG. 2, a subscriber provides the network with message routing and delivery instructions. These instructions are received by a PCI database 44 and stored in a "subscriber profile" for that subscriber. This database controls the delivery of outgoing messages and the routing of incoming messages and message notification. (In FIG. 2, wireline communications are indicated with solid line connections and wireless communications are indicated with dashed line connections. The instructions to the PCI are shown with a solid line, but as will be explained in greater detail below, the instructions may be sent either by a wireline or wireless network.)

The PCI database 44 supports access to information authenticating the subscriber's identity and validating the types of services subscribed to, the subscriber's message delivery (incoming messages) options and origination (outgoing messages) options and voice (telephone call and voice mail) options. For origination, the subscriber may select message distribution lists with specific media delivery options. The database 44 also supports access to the portions of the subscriber profile that the subscriber may control.

The subscriber may use a personal telephone number to register at alternate wireline and wireless terminals while maintaining use of the message screening and delivery options selected and stored in a subscriber's profile. This is called "personal mobility". Information about the location of a wireless or wireline network location to which the subscriber's terminal is connected automatically registers and deregisters a subscriber's terminal. This is called "terminal mobility."

Figure 3:
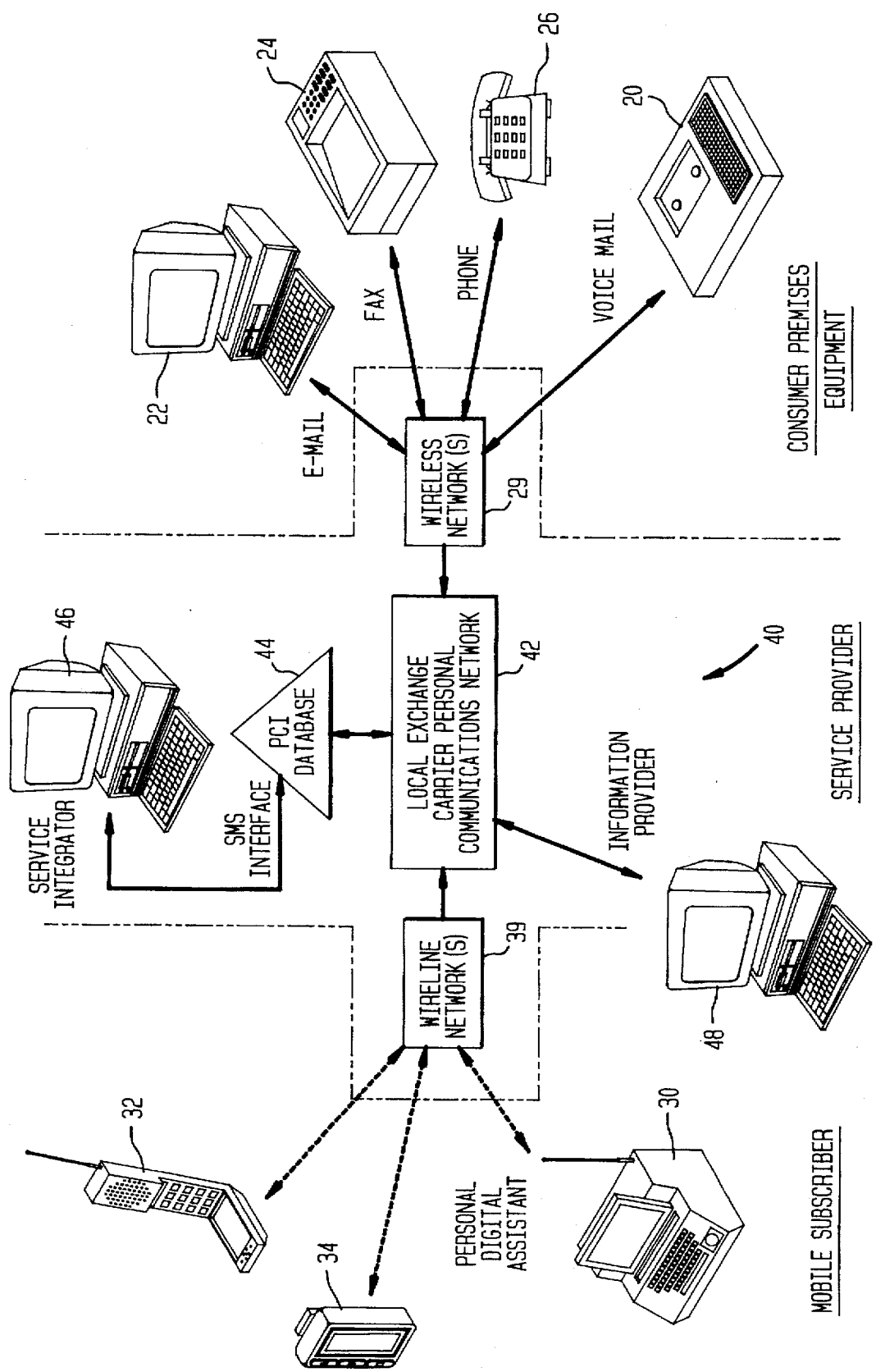

FIG. 3 shows the PCI 40. The CPE (voice mail 20, e-mail 22, fax 24, and phone 26) are connected to wireline networks 29. The mobile subscriber equipment (PDA 30, cellular phone 32, and pager 34) are connected to wireless networks 39. Both the wireline and wireless networks 29, 39 are connected to a PCI 40 at a service provider. The networks 29, 39 are connected to a local exchange carrier (LEC) 42 for the personal communications internetworking.

A PCI database 44 is a physical communication system which provides call processing functions for a collection of central office switches. The PCI database 44 includes the mobile subscriber's profile, including message sending, message receiving, and service control options. The PCI database 44 may be a service control point (SCP) or a network adjunct. The PCI database may be connected via a service management system (SMS) interface to a service integrator 46. The service integrator 46 allows the service provider to update subscriber data and create and modify subscriber profiles.

The PCI database 44 preferably stores and updates the subscriber profiles. The profiles contain service related information for mapping services to subscribers (e.g., screening, routing, terminal selection by subscriber selected parameters, custom calling features, and the like); subscriber authentication data (e.g., password and user I.D.); user status (registered or not registered); generic service profile for non-call associated service, such as subscriber address or social security number; specific profile for a non-call service (based on subscriber selected parameters); wireless data providers identification (e.g., what cellular phone provider is used); and specific profile for call associated services (e.g., call forwarding), based on user selected parameters.

Figure 4:
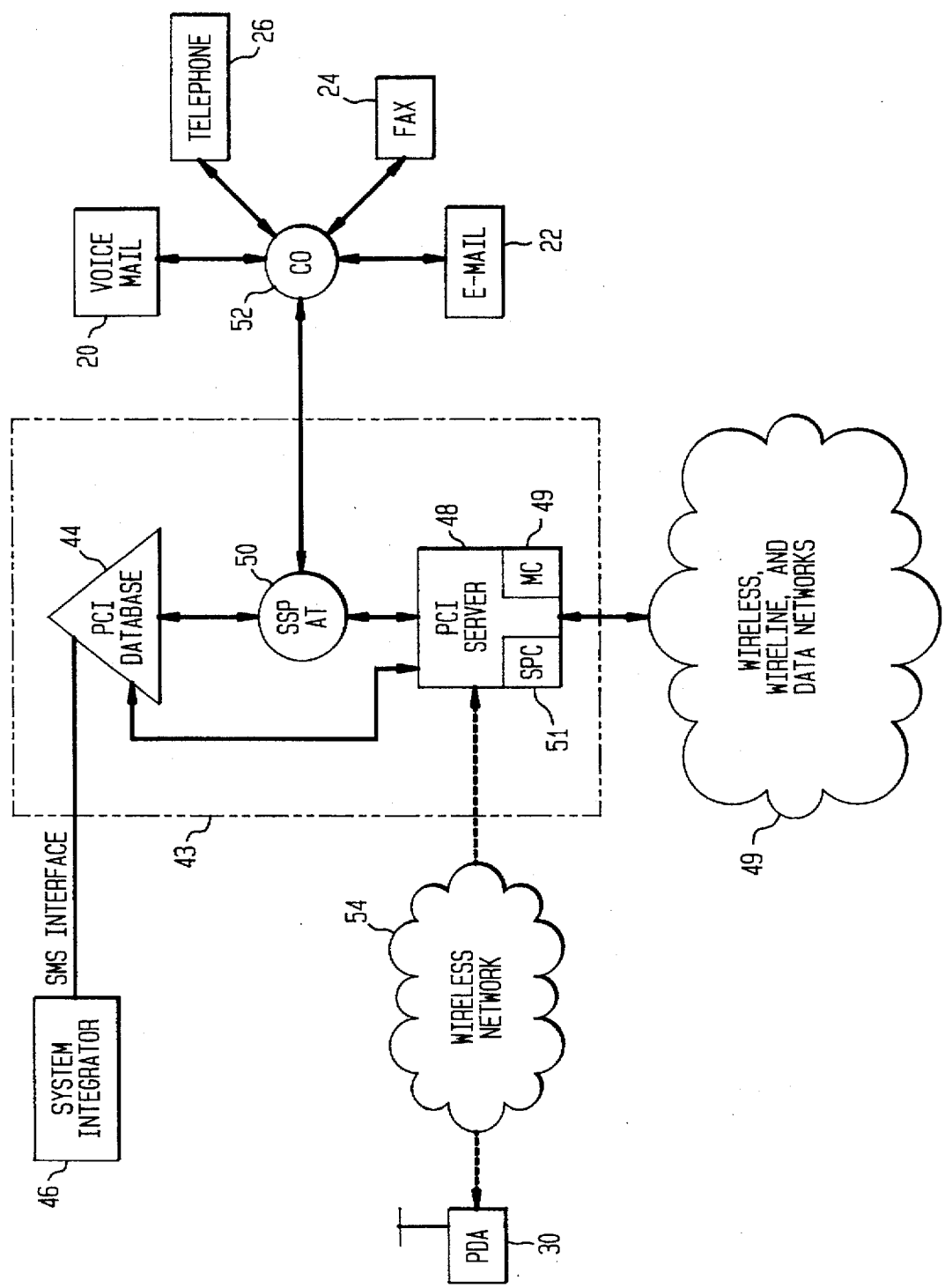
FIG. 4 is an overview of one node of the PCI network according to the present invention.

FIG. 4 is a more detailed depiction of the one node 43 of the PCI. The PCI has a plurality of nodes and is preferably built on the Advanced Intelligent Network (AIN) architecture. Other network architectures may be used, but for illustrative purposes, the description is directed to an AIN-based network.

A PCI server 48 is a peripheral which performs messaging and call redirection functions and interfaces with the PCI database 44 to update the subscriber profile. The PCI server may be an AIN Intelligent Peripheral, such as a Bellcore Intelligent Services Peripheral, or a network adjunct. The PCI server is connected to a switch 50. In the AIN architecture, this switch is a Service Switching Point Access Tandem (SSP AT), but may be any suitable switch, depending on the architecture. The SSP AT 50 connects wireline networks to the CPE. The SSP AT 50 also connects the PCI server 48 with a central office (CO) 52. The SSP AT 50 also connects to the SCP 44. The SCP 44 and the PCI server 48 are directly connected. The LEC of FIG. 3 is part of a large network and includes the PCI database 44, the PCI server 48, and the SSP AT 50. The PCI database may be connected to an SMS interface to a system integrator 46, as described above.

The PCI server 48 is also connected to various wireless and wireline networks 49 via signaling connections in these networks to transmit and receive information for all of the messaging options. Illustratively, the PCI server provides access to Public Packet Switched Networks (PPSN), Public Switched Telephone Network, (PSTN), Integrated Signaling Digital Networks (ISDN), X.25 networks and TCP/IP networks and may include access to asynchronous transfer mode (ATM), Switched Multimegabit Digital Service (SMDS), and Frame Relay networks.

The mobile subscriber may access his or her subscriber profile to change message sending, message receiving, and service control options. These option changes are sent to the PCI database 44 to be stored in the subscriber profile FIG. 4 shows, for example, a PDA 30 connected to the PCI server 48 by a wireless network, but the subscriber may also use wireline e-mail, or wireless or wireline telephones (using DTMF signals) to access the subscriber profile. The messages from the PDA, for example, are sent by a wireless network 54 to the PCI server 48 using, for example, an X.25 transport.

Delivering PCI service to a subscriber who may be present on a number of different systems requires storage, movement and caching of the service profile associated with that subscriber. A mobility controller 49, located in the PCI server 48, is a controller and data store, which dynamically maintains service control information for a Message Transfer Agent (MTA), described below, in the PCI server 48, which connects the PCI server 48 to wireless data networks.

Data storage functions are handled by two tiered entities. The subscriber profile is preferably located in the PCI database 44 and is the top of the hierarchy where permanent records such as service profile, authentication and validation information, and the like of the subscriber or device are maintained and performing status and location management and mapping are performed. A service profile cache 51 is preferably located in the PCI server 48 and is a local cache entity which stores on a "needs basis" information such as service profiles and validation status and maintains a local repository for the service recipient. It also administers information necessary to serve the wireless data network entity, as well as sending updates to the permanent storage entity PCI database. The service profile cache 51 maintains the personal data associated with the processing of the mobility controller 49. The mobility controller 49 interacts with the PCI database-based subscriber profile (or third party database) on behalf of the cache to obtain service profiles and location information related to wireless terminals.

PCI may also provide directory services as a value-added component. The X.400 MTA can query a local directory serving agent in the PCI server 48 for addressing and routing information. If the information is not local, the PCI server 48 will need to get the addressing information from another PCI server 48 at another PCI node or an interconnected private directory serving agent which maintains a separate information base. By using the existing standard, the PCI network and mail PCI servers message handling can independently manage the networks without interfering with the PCI service.

II. The PCI Server

The PCI server is a peripheral which performs messaging and call redirection functions and interfaces with the service Control Point to update the subscriber profile. The PCI server performs a variety of functions. For example, an illustrative PCI server:

is an X.400 Gateway;

routes messages using the X.400 messaging protocol;

connects proprietary messaging protocols into X.400 protocol;

interfaces with wireless data networks;

interfaces with messaging systems;

interfaces with the PCI database to access subscriber profiles information;

processes messages as specified by the user in the service profile;

provides media conversion such as text to fax or fax to text;

provides access to an X.500 directory to determine addressing schemes for packet data;

supports signaling between wireless data networks for management functions such as registration; and maintains a service profile cache.

FIG. 5 is a detailed illustration of a preferred embodiment of a PCI server 48 according to the present invention. The PCI server 48 includes three main elements: a call processor 110, a data messaging peripheral 112, and a shared disk memory 113.

The call processor 110 comprises a plurality of interconnected computers. The messaging peripheral 112 maybe implemented by a computer such as a DEC XAP system.

The call processor 110 includes a PCI applications server 114. The application server is the central decision making point of the wireless messaging service described below in Section VI. Thus, the server 114 controls message routing, screening, and notification for the wireless messaging service.

The application server 114 is connected to a PDA protocol handler 115. The protocol handler is the interface to the wireless network 54, for example the RAM wireless network. This handles messages to be sent to and from the subscribers PDA 30. A plurality of personal digital assistants (PDA) 30 are connected to the wireless network 54.

The application server 114 also manages a PCI database protocol handler 126. The protocol handler 126 is the interface between the call processor 110 and the PCI database 44. The application server 114 also manages a Service Profile Cache (SPC) 51. The SPC 51 is maintained in the memory of the application server 114. The SPC 51 stores a subset of the data in the subscriber profile stored in the PCI database 44. This subset is subscriber profile information which currently needs to be accessed frequently by the PCI server 48.

The SPC 51 stores and accesses data related to access systems such as wireless data providers and messaging services, and subscriber location. The SPC 51 may store and update data related to the subscriber location such as routing address for subscribers specific wireless terminals; store and updates services related data for a particular terminal type (such as uni- or bi-direction); maintain a list of the subscribers wireless data provides and message services; track the subscribers terminal status (registered or not registered); provide a generic service profile for non-call messaging service; and provide a specific profile for a non-call associated service based on subscriber selected parameters.

The application server 114 also manages the registration status of each application on each PDA 30 and controls customer profile information via each PDA 30.

The call processor 110 also includes an IP Functions Server 130. The IP Function Server 130 manages CallCommand applications. This server is also connected to the PCI database protocol handler 126 for communication with the PCI database 44 and the PDA protocol handler 115 for communication with the wireless network 54. The PCI database protocol handler 126 handles both interfaces between the PCI database and the PCI server, as described below.

Thus, the two main application servers in the call processor 110 are the IP Function server 130 for CallCommand applications and the PCI applications server 114 for wireless messaging services.

The call processor 110 also includes a plurality of communication interfaces. The protocol handlers 115 and 126 have already been discussed. The alphanumeric paging server (APS) 132 gives the call processor 110 the ability to provide alphanumeric paging services. The APS 132 includes one or more modems to communicate with terminal equipment of a network 134 maintained by a paging service provider. The APS communicates with the paging service provider using, for example, the TAP protocol (Telocator Alphanumeric Protocol).

The call processor 110 also includes a plurality of control processes which control peripheral equipment external to the call processor 110. These controllers are as follows:

A message controller 112 controls the data messaging peripheral 136 and controls the sending of messages between the call processor 110 and the data peripheral 112.

The mobility controller 49 comprises the PCI database protocol handler 126, the IP function server 130, the service profile cache 51, and the PCI application server 114. The mobility manager provides control logic for user authentication, service request validation, location management, user access to service profile, access registration, and communication management such as routing to user-specified destinations. The mobility controller 49 contains the service logic and handles service related processing for personal data and service access such as service feature analysis; access system mapping relationship information; identity management; subscriber validation and authentication; billing information based on the subscriber; wireless data specific routing information for message delivery and subscriber paging; subscriber service validation; and subscriber review and modification of the subscriber's profile.

A transaction controller 150 controls a switch controller 152 and a voice peripheral controller 154. The switch controller 152 controls the digital switch 156 which connects to the public switched telephone network 58. The voice peripheral controller 154 controls the voice peripherals 160, which are for example text-to-speech converters.

The switch 156 and the voice peripheral 160 are also connected by a T1 line 161. The digital switch 156 is connected to the public switched telephone network by a plurality of transmission media such as T1 lines 162, fax lines 163, and ADSI lines 164.

The data messaging peripheral 112, which is optional, is now discussed in greater detail. The data messaging peripheral is the gateway to the wireline electronic mail network, which network is designated 170. The data messaging peripheral has a message transfer agent 158 for transferring messages between the call processor 110 and the data networks 170, 54 either directly or through the PDA protocol handler 115. The messaging peripheral 112 also includes a POP (post office protocol) server 190 and associated memory 192 for providing a message storing capability. The message directory 194 is used for storing a subset of service profile cache 51 relating to the routing of e-mail messages.

The messaging peripheral 112 includes the message gateway 140. The message gateway 140 has the following capabilities:

1) Notifying the PCI application server 114 in the call processor that e-mail has arrived from the wireline e-mail network 170 for a subscriber.

2) Accept a request from the PCI application server 114 to send an e-mail message to a wireline address.

3) Accept a request from the application server 114 to provide all unread messages stored in the server 190 which would have been sent to a primary destination if the subscriber had been registered.

4) Accept a request from the application processor 114 to rewrite to the message store server 190 or back to the sender.

Using the call processor 110 and its associated peripherals, a wide variety of services may be performed. These have been discussed above briefly. However, to understand how the call processor 110 operates to provide these services, an exemplary description is provided.

For example, when a wireline e-mail message arrives at the PCI server's Data Messaging Peripheral 112, the messaging gateway 140 and messaging Controller 136 send notification to the PCI application server 114 of the e-mail arrival. The PCI application server 114 will query the profile cache 51, or if necessary, the PCI database 44. Driven by data in the subscriber's profile, the PCI application server 114 executes service logic to determine where to forward the e-mail (i.e., forward to PDA 30 or to POP server 190 depending on screening outcome), and what media, if any, to use to send notification of the e-mail arrival.

If a subscriber wishes to update the subscriber profile by DTMF, the procedure is as follows. A call arrives at the PCI server 48. The switch controller 152 and transaction controller 150 forward the call to the IP functions server 130 based on the dialed number. The IP functions server 130 sends a provide_instructions 1129+message to the PCI database 44 to determine how to handle the call. The PCI database 44 sends a request to play an announcement and collect digits ("please enter PIN", collect PIN). The IP functions server 130 returns the result of this request to the PCI database 44. Again the PCI database 44 sends a request to the IP functions server 130 to play an announcement and collect digits ("voice menu", menu selection). The IP functions server 130 returns the result of this request to the PCI database 44.

This process repeats as users are guided through menus and change profile elements. The PCI database 44 interprets the collected DTMF tones and updates the subscriber's profile accordingly.

When a PDA 30 sends an e-mail message addressed to a wireline address the procedure is as follows. The PDA 30 sends a UDP send_mail message to the PCI application server 114. The PCI application server 114 detects the message is not destined for another PCI subscriber and forwards the request to the messaging controller 136, which forwards it to the messaging gateway 140 which is in the Data and Messaging Peripheral 112. The messaging gateway 140 interfaces with the MTA 158 to send the e-mail to the wireline network 170 using, for example, the Simple Messaging Transfer Protocol (SMTP).

The PCI server 48 may be based, for example, on either an X.400 MTA or an SMTP router and can convert between both protocols. The PCI server 48 may receive text messages from a variety of different text messaging systems such as Internet mail, third party messaging systems, or proprietary messaging systems. In the example where PCI routes messages using an X.400 MTA, these messages must be converted to conform with X.400 protocol before they can be routed. Thus, an exemplary messaging gateway is an X.400 gateway, which can be designed and built by a person of ordinary skill in the art.

III. The PCI Database

A PCI Database 44 maintains the subscriber profile, controls the CallCommand functions, and handles DTMF-based subscriber profile updates.

The PCI database architecture shown in FIG. 6 comprises several application and support components. The application components include Multiple Services Application Platform (MSAP) 202; Service Provisioning and Creation Environment (SPACE) 204; and Data and Report Subsystem (DRS) 206.

The service components include the Maintenance and Operation Console (MOC) 208; the Intelligence Peripheral Interface (IPI) 210; the Generic Data Interface (GDI) 212; the Service Network Interface (SNI) 214; and the Data and Report database (D&R) 218.

The service network interface (SNI) 214 provides a communication interface to external systems such as switch 50 and PCI server 48. These interfaces include the IPI 21 0 and GDI 212 which connect the PCI database to the PCI server via the TCP/IP network 213. The GDI 212 is used for uploading and downloading a subscriber profile to the PCI server 48. The IPI 210 is used for transmitting DTMF commands from a user via the PCI server 48. For redundancy, each intelligent peripheral interface (IPI) and generic data interface (GDI) processor preferably requires two logical connections to the PCI server.

The Multiple Services Application Platform (MSAP) 202 includes a call processor 220, a first call process request (CPR) database 222, an MSAP common 224, a shared memory 226, and a call contact database (CCDB) 228. The call processor 220 receives messages from and sends messages to a message distributor 219 in the SNI 214. The message distributor determines whether the message received from the call processor 220 is to be sent to the IPI 210 or the GDI 212. The call processor receives messages from the message distributor and sends them to the first CPR database, the CCDB 228, and/or the shared memory 226. The first CPR database 222 stores the subscriber profiles. The MSAP 224 connects the first CPR database 222 with the second CPR 230, which resides in SPACE 204. MSAP common 224 updates one of the CPR databases 222, 230 when changes have been made to the other CPR database. The CCDB 228 is a temporary, dynamic storage for storing subscriber profiles, and related data during profile update procedures. The shared memory 226 allows different processors to use the same data.

SPACE 204 is a service provider-operated module through which new PCI database applications are created and new subscriber profiles are initiated. SPACE 206 includes the second CPR database 230 which contains the identical information as the first CPR database 222 in MSAP 202. When a new subscriber profile is to be created, a service provider uses a display terminal 232 in SPACE to provision a new service profile including certain subscriber information. The subscriber profile is activated through MSAP when the user initially registers. Service provider changes made to the second CPR database 230 are transmitted to the first CPR database 222 in MSAP via the MSAP common 224. Changes made to the second CPR database 230 by a service provider are not transmitted to the service profile cache 51 in the PCI server 48 until a later time. That is, the PCI database 44 does not send data to the PCI server 48 unless requested by the server 48. The server profile cache 51 will be updated with this new information the next time the PCI server 48 requests a profile download, for instance when the subscriber next registers. SPACE 204 provides a function parallel to the Service Management System described above.

The Data and Report Subsystem (DRS) 206 collects data about the PCI database 44 usage which may be helpful to the service provider. For example, errors made by the subscriber when updating the user profile are noted. The types of alterations made, times such alterations are made, and the like are also stored for future use by the service provider.

MOC 110 is a network maintenance support system which monitors the status of the network and checks for system failures and the like.

When a subscriber wishes to update the subscriber profile using a PDA 30, the procedure is as follows. The PDA 40 communicates with the PCI server 48. The PCI server 48 sends a GetData message having a "Service Key", which is a preferably a ten digit PCI subscriber number (e.g., a telephone number), to the PCI database 44 over the GDI 212. The GDI 212 translates the GetData message into a format understandable by the PCI database 44. The message is sent through the message distributor 219 and call processor 220 to the first CPR database 222 where the subscriber profile resides. The Service Key is used to obtain the correct subscriber profile and the profile is sent through the call processor 220 to the message distributor 219o The message distributor determines that this message is to be sent to the PCI server 48 via the GDI 212. (The reason for this is discussed below.) The GDI 212 translates the data into a format suitable for the TCP/IP network and is transmitted to the PCI server 48. The requested changes are performed in the PCI server 48 and the updated profile is sent back to the PCI database 44 through the TCP/IP network, the GDI 21 2, message distributor 219, call processor 220 and to the first CPR database 222. The call processor 220 also sends a message through the GDI 212 to the PCI server 48 which will be sent a wireless transmission to the PDA 30 acknowledging the subscriber profile update. The changes are also sent to the MSAP common 222 where they are sent to the second CPR database 230 in SPACE 204.

During this process, information may be temporarily stored in the Call Contact Database (CCDB) 228. The CCDB database 228 provides temporary storage for subscriber profile updates that are suspended because they are waiting for action by a subscriber or waiting for data from an external system, such as the PCI server 48. During the time intervals between action by the user or delays in receiving data from an external system, the call processor 220 stores the information in the CCDB database 228 and processes other calls.

When a subscriber desires to update his or her subscriber profile using a touch tone phone, the procedure is as follows. The subscriber calls, for example, a service number provided by the service provider. The call is routed to the PCI server 48. The PCI server 48 sends a message to the PCI database 44 via the IPI 210 that the DTMF commands are present. The message is sent through the message distributor 219 to the call processor 220. The appropriate subscriber profile is retrieved from the first CPR database 222 in the MSAP 202.

The call processor 220 instructs the PCI server 48 to play a voice announcement instructing the caller to enter the subscriber ID and password, by pressing the appropriate digits on the touch-tone phone. The information is entered by the caller, and the PCI database 44 validates this information. If the validation determines that the caller is an authorized subscriber, the PCI database 44 instructs the PCI server 48 to ask the subscriber to select which subscriber profile information is to be modified. Currently, only two fields are modifiable using DTMF messaging: changing a wireline registration or recording a personalized greeting. The subscriber selects either registering at a wireline phone or recording a personalized greeting. If wireline registration is selected, the PCI database 44 instructs the PCI server 48 to prompt a ten digit telephone number to which all incoming calls will be routed. If the subscriber selects to record a personalized greeting, the PCI database 44 instructs the PCI server 48 to prompt the subscriber for a new greeting.

If invalid information is entered at any time, the PCI server 48 plays an error message to the subscriber and the subscriber retries the modification. If the retry fails, the call is terminated. Otherwise, the subscriber's profile is updated according to the modification, data synchronizing the messages are sent to the PCI server 48 and the call processor 220 instructs the PCI server 48 to inform the subscriber that the PCI service profile was updated.

The call processor 220 also sends a message through the message distributor 219 to the GDI 212 and to the PCI server 48 which updates the service profile cache 51 in the PCI server 48. The changes stored back in the first CPR database 220 are sent to the MSAP common 224 where they are sent to the second CPR database 230. Note that DTMF function signals, which use the 1129+protocol, are routed through the IPI 210 and the subscriber profile data, which uses the GDI protocol, are routed through the GDI 212.

IV. The PCI Server/Database Interface

The interface between the PCI server 48 and the PCI database 44 is based on two protocols. The first protocol is 1129+. This protocol will be used to support the PCI CallCommand feature and for subscriber initiated profile manipulation using DTMF. The second protocol is Generic Data Interface (GDI). The GDI is used for subscriber profile management, specifically downloading a subscriber profile from the PCI database 44 to the PCI server 48 and for applying updates to the profile stored in the PCI database 44.

Figure 7:
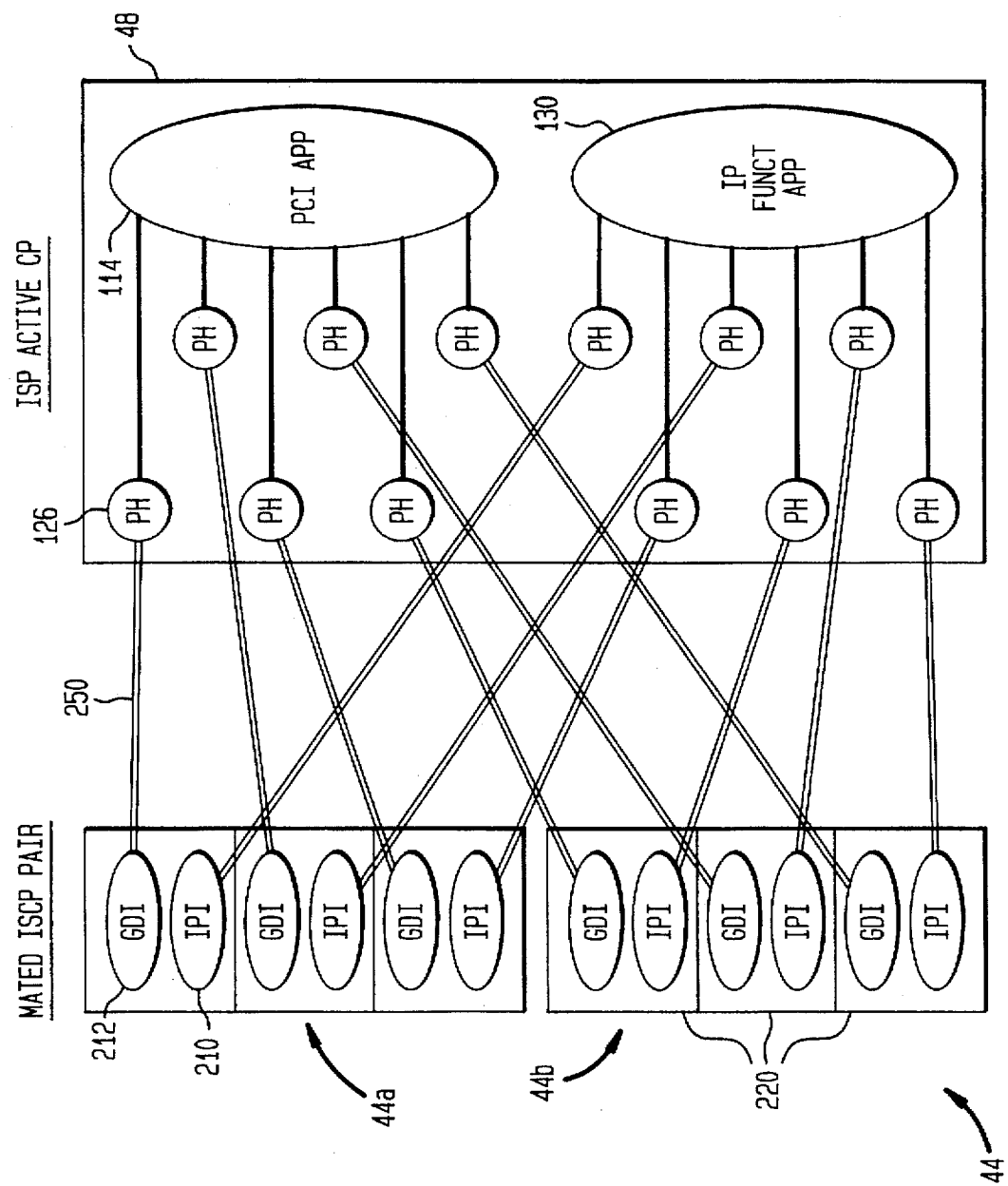
FIG. 7 is a block diagram of the logical connections between the PCI server and PCI database according to the present invention.

FIG. 7 shows the logical links from the PCI database 44 to the PCI server 48. The PCI database 44 consists of a mated pair of PCI databases 44a, 44b, each containing three call processors 220 which each share the load. The links 250 are TCP/IP links between Intelligent Peripheral Interface (IPI) 210 and the Generic Data Interface (GDI) 212 processors on the PCI database 44 to the PCI server call processor. Two logical connections are made from each IPI 210 and GDI 212 processors to the PCI server for redundancy. Thus, a full SCP configuration supporting PCI would preferably require 24 logical links, as shown in FIG. 7. The PCI database initiates the opening of the logical links.

In this illustrative embodiment, the CallCommand feature employs the 1129+protocol. For the wireless messaging feature, PCI uses the GDI protocol. The GDI tag IDs assigned for the PCI subscriber profile elements are provided in Appendix B.

Appendix B also shows the PCI profile data, including the profile elements, their data types, maximum lengths, and GDI tag IDs. An * indicates elements which were shortened to 32 bytes because of GDI byte limitations. The description of the types and lengths of these elements is as follows:

dN BCD-encoded digits. The number N represents the maximum number of BCD digits, not octets.

cN Up to N ASCII characters.

cN Binary integer N bytes in length, in network byte order (highest order bit transmitted first).

Because the portion of the PCI subscriber profile downloaded to the PCI server is large (preferably approximately 1,000 bytes), and a maximum Transaction Capable Application Program (TCAP) message size is 256 bytes, the profile must be managed in segments. The service profile is divided into six segments as shown in Table 1. Each segment is assigned a unique numeric identifier.

| PCI Profile Segment | Segment ID (decimal) |
|---|---|
| Personal data | 1 |
| CC service profile | 2 |
| e-mail routing | 3 |
| e-mail subject screening | 4 |
| e-mail from screening | 5 |
| Voice mail profile | 6 |

Certain data in a subscriber profile provides a subscriber's preferred media for messages delivery and notification. The encoding for these types are given in Table 2.

| Media Type | Code |
|---|---|
| Alphanumeric Pager | A |
| e-mail message store | S |
| Fax | F |
| PDA | P |
| Voice mail | V |
| Wireline e-mail | E |
| Null | Z |

For example, if the subscriber prefers to receive e-mail which passes screening via the PDA 30, then the "primary destination one" profile element will contain a "P".

Figure 8:
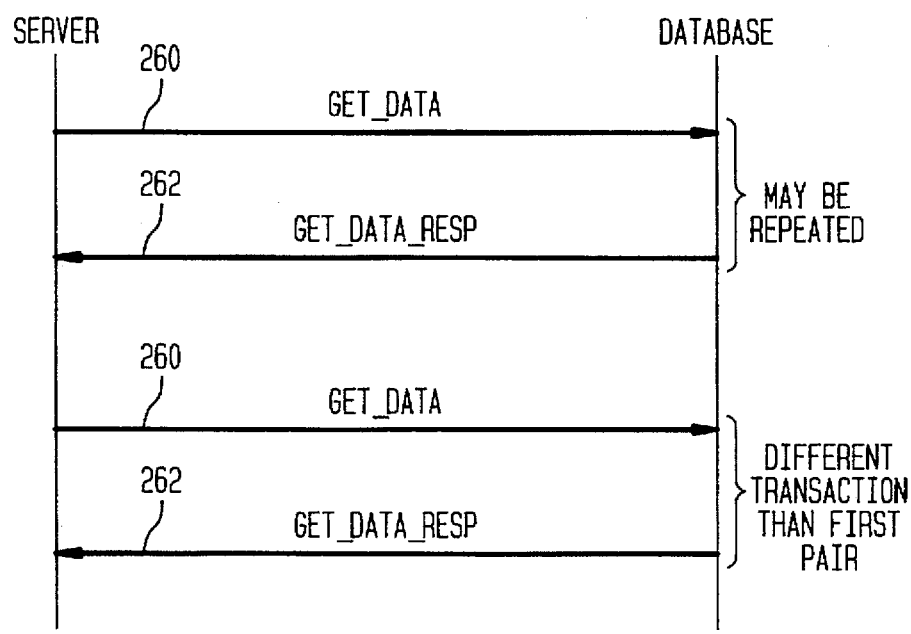
FIGS. 8, 9, and 10 illustrate exemplary message flows between a server and a database according to the present invention.

FIG. 8 illustrates a message flow for profile retrieval using the GDI protocol. A subscriber attempts to register with the PCI server either explicitly or implicitly (registration is discussed in detail below). The PCI server 48 send a GDI GetData query to the PCI database 44 over one of the GDI links (line 260). The PCI server 48 may send one GetData data query for each PCI profile segment. Each query will be processed by the PCI database 44 as an independent transaction with a unique TCAP transaction ID. Each GetData query sent by the PCI server 48 will include a "Service Key" parameter which is a ten-digit PCI subscriber number (e.g., a telephone number). This key should be used by the PCI database 44 to identify the subscriber. In each GetData is a list of tag IDs listed in the profile elements to be retrieved. The PCI database 44 responds to the GetData data query with a GetData response (line 262). The response contains a return code and data for each element requested in the GetData data query.

Figure 9:
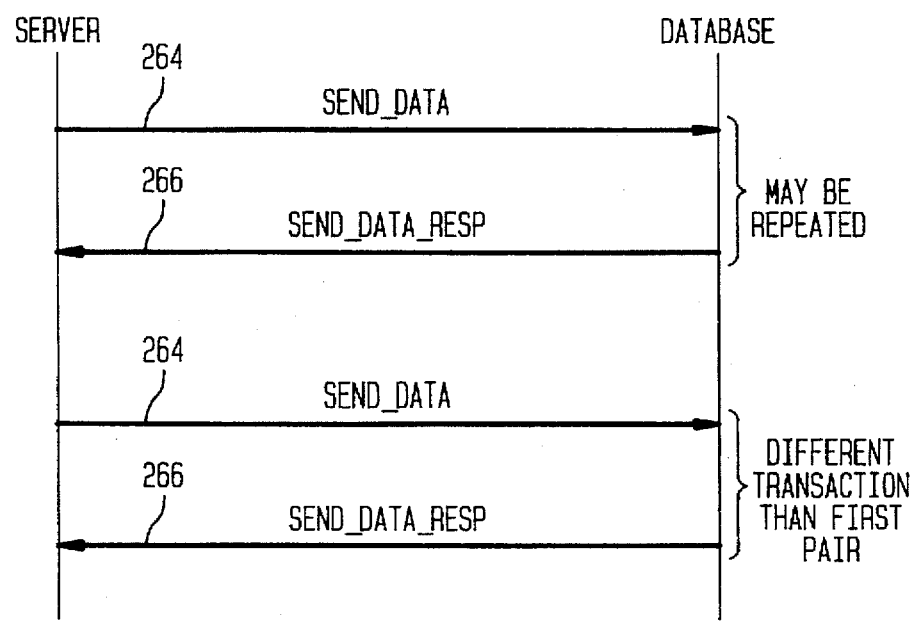

FIG. 9 provides a message flow between the PCI server 48 and the PCI database 44 for a profile update originating from a wireless PDA 30. This wireless profile update uses the GDI protocol. A subscriber performs a profile manipulation activity, and the PDA 30 sends a profile data message to the PCI server 48. The PCI server 48 sends a GDI SendData query to the PCI database 44 over one of the GDI links (line 264). The PCI server 48 may send one SendData query for each PCI profile segment for which a profile element was updated. Each query will be processed by the PCI database 44 as an independent transaction with a unique TCAP transaction ID.

Each Send Data query sent by the PCI server 48 will include a "Service Key" parameter which is the ten digit PCI subscriber number. This key should be used by the PCI database 44 to identify the subscriber. Each SendData query contains a list of tag IDs provided in Appendix B and data for the profile elements to be updated. Not all tags in this segment may be included in the Send Data query; only those profile elements which are actually updated by the subscriber will be sent. The PCI database 44 should not update data for which no tag was included in the SendData query.

The PCI database 44 responds to the SendData query with a Send Data response (line 266). The response contains a return code for each element requested in the SendData query.

Figure 10:
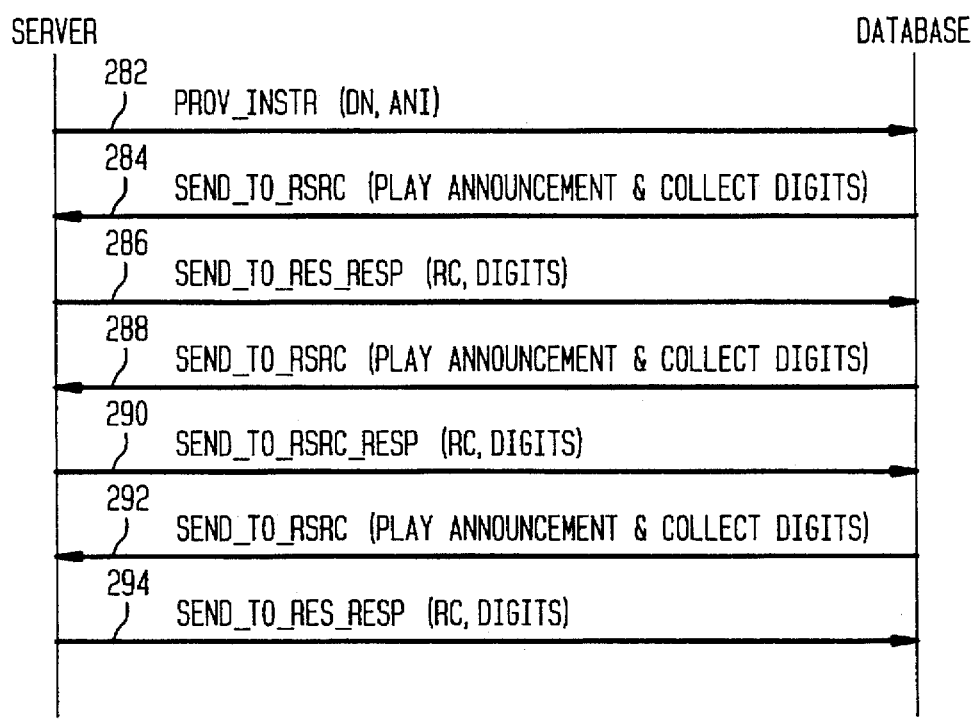

FIG. 10 is an illustrative example of one possible message flow between the PCI server 48 and the PCI database 44 for a DTMF profile manipulation message. The DTMF profile manipulator uses the 1129+protocol through the IPI 210. The exact call flow for DTMF profile manipulation depends upon the implementation of service logic by the service designer, and upon options selected by the PCI subscriber.

As shown in this illustrative example, when a call arrives at the PCI server, the PCI server sends an 1129+provide__ instructions query to the PCI database (line 282). The called number contains a dialed number (i.e., the service number for a DTMF updates), while the ANI (automatic number identification) field contains the ANI, if any. The PCI DTMF profile manipulations Call Process Request (CPR) is triggered by the dialed service number. The CPR 222 instructs the PCI server to play announcements and collect digits, guiding the subscriber through voice menus and prompts (lines 284, 288). The PCI server responds to each request with digits collected (lines 286, 290, 294). The CPR updates subscriber's profile with data collected via DTMF.

V. PDA/PCI Interface

Figure 11:
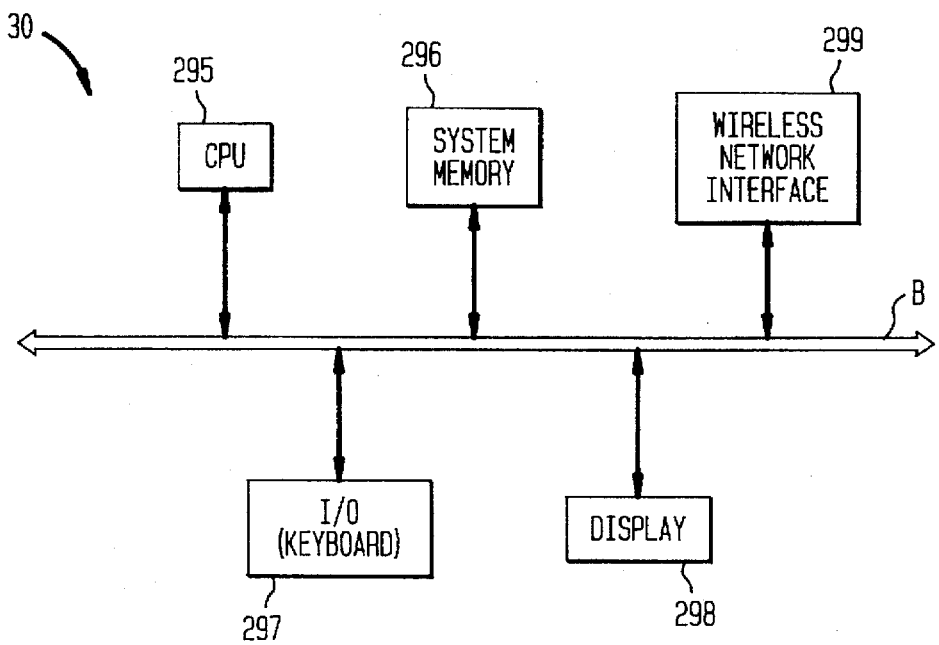
FIG. 11 is a block diagram of a personal digital assistant according to the present invention.

Communication between the PDA and PCI use, for example, an X.25 transport using the UDP IP protocol. A brief discussion of the PDA structure is provided. The PDA 30 is preferably a notebook or palm top computer having a wireless network interface. The PDA may be, for example a Hewlett Packard Omnibook 300 notebook computer running a PCI application. FIG. 11 illustrates an exemplary PDA. The PDA 30 has a central processing unit 295 connected to a bus B. The central processing unit ("CPU") 295 performs most of the computing and logic functions of the PDA 30. A memory 296 is connected to the bus B, which stores information to be provided to the CPU 295 or otherwise used by the PDA 30. An input/output device 297, such as a keyboard, is also connected to the bus B which allows a user to input data for storage in memory 296 or for use by CPU 295. A display 298 is connected to the bus B. The PDA 30 also has a wireless communication interface 299 for communication with a wireless communication network.

The PDA/PCI interface involves six types of message flow. These messages are: (1) registration/deregistration; (2) wireless messaging; (3) retrieving e-mail; (4) cross-media notification; (5) CallCommand; and (6) profile management.

There are two types of registration and deregistration: explicit and implicit. Explicit registration occurs when a PCI subscriber starts the PCI application software on the PDA 30 (this is called start-up registration) or when the subscriber clicks a status check button or one of the service registration request buttons on the PDA 30 either for the CallCommand or wireless messaging service. Once successfully registered, if the subscriber's profile is not already present in the service profile cache 51 maintained by the PCI server 48, the PCI server 48 will request a download of the subscriber's profile from the PCI database 44 to the service profile cache 51. The PCI server 48 sets the subscriber's registration status in the cache 51 to match those requested by the subscriber for the wireless messaging service for the call command service.

Figure 12:
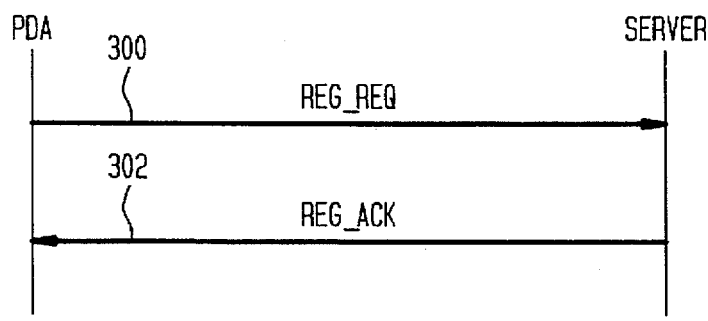
FIGS. 12, 13, 14, 15a, 15b, 16, 17, 18a and 18b illustrate exemplary message flows between a PDA and PCI server.

FIG. 12 illustrates one example of the message flow between the PDA 30 and PCI server 48 during explicit registration. This flow is also used by a subscriber to check registration of CallCommand or wireless messaging services. A subscriber starts the PCI application software on the PDA or clicks the service status check, CallCommand registration, or wireless messaging registration buttons on the PDA. The PDA sends a registration request to the PCI server 48 with the subscriber's validation information (subscriber ID and password) (line 300). The PDA 30 also starts a timer during which the PDA 30 will wait for a response from the PCI server 48. The PCI server 48 server receives the registration request and checks if the subscriber is provisioned and if the subscriber ID and password are correct. The PCI server then sends a registration acknowledgement (line 302). If the subscriber is not provisioned, no service profile exists and the acknowledgement includes an "unrecognized subscriber" response. If the subscriber ID and password are invalid, the acknowledgement includes an "incorrect password/PIN" response. Otherwise, the PCI server acknowledgement includes a "success" response. If the PDA 30 does not receive an acknowledgement from the PCI server within a predetermined time, it aborts the registration attempt and tells the subscriber to try again later.

Implicit registration automatically registers a subscriber for the wireless messaging service when the subscriber is currently not registered and wishes to send or fetch e-mail from or to a PDA 30. Implicit registration is done as follows. The PCI server receives a fetch or send request from a subscriber who is not registered for the wireless messaging service. The PCI server 48 retrieves a copy of the subscriber's service profile from the PCI database 44, if necessary, and validates the subscriber's ID and password. The PCI server 48 validates the profile contents to make sure that subscriber may use the wireless messaging service. If wireless messaging is permitted, the PCI server 48 processes the request. Otherwise, it sends an acknowledgement indicating the reason why the subscriber is not permitted to use the wireless messaging service. The message flow is the same as illustrated in FIG. 12.

Once the subscriber is registered for either the CallCommand service or the wireless messaging service, the subscriber remains registered until the subscriber explicitly deregisters by either quitting the application or clicking the deregistration button on the PDA 30. The subscriber can also be implicitly deregistered for the wireless messaging service by the PCI server 48 provided the PCI did not detect any wireless messaging activities to or from that subscriber for a given duration of time. Although the subscriber is deregistered, the subscriber's service profile will remain in the service profile cache 51. The profile remains in the cache as long as the PCI server has some activity for the subscriber, such as incoming e-mail messages within a predetermined time, such as four hours.

No PDA-to-PCI server messages may be sent be the subscriber to implicitly register for CallCommand, thus, a subscriber should not be implicitly deregistered from this service. Implicit registration and deregistration occurs only for the wireless messaging service, and not for CallCommand. A subscriber remains registered for CallCommand as long as he or she is running the CallCommand software application on the PDA.

Figure 13:
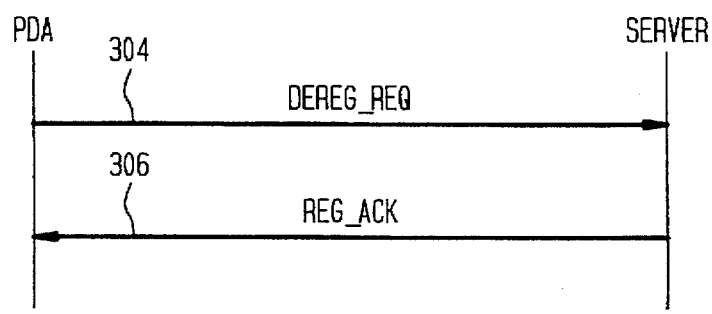

Explicit deregistration occurs when a subscriber quits the PCI application software on the PDA (this is called exit deregistration) or when the subscriber clicks one of the service deregistration request buttons on the PDA for the CallCommand or wireless messaging services. FIG. 13 is an illustrative embodiment of a message flow between the PDA 30 and PCI server 48 for explicit deregistration. A subscriber quits the PCI application software on the PDA or clicks a deregistration button on the PDA, The PDA 30 sends a deregistration request to the PCI server 48 with the subscriber's validation information (the subscriber ID and password) (line 304). The PDA 30 also starts a timer during which the PDA will wait for a response from the PCI server 48. The PCI server 48 sends an acknowledgement (line 306). The PCI server 48 receives the deregistration request and checks if the subscriber ID and password are correct. If the subscriber ID and password are not correct, the acknowledgement includes an "incorrect password/PIN" response. Otherwise, the acknowledgement includes a "success" response. If the PDA 30 does not receive an acknowledgement from the PCI server 48 after a predetermined time, the PDA 30 assumes that it is out of radio coverage and informs the subscriber to retry later.

Implicit deregistration occurs when the PCI does not detect any wireless messaging activity from or to the subscriber for a given duration of time, for example four hours. The PCI will also try to implicitly deregister a subscriber from the wireless messaging service in the middle of the night in the event that the subscriber inadvertently left the PDA 30 turned on. The PCI server 48 keeps a time-stamp of the most recent wireless messaging activity for each registered subscriber in the subscriber's service profile maintained in the service profile cache 51. Whenever the PCI server 48 detects any wireless messaging activities to or from a particular subscriber, the time-stamp is updated to the current time. The stored time-stamp of a registered subscriber is periodically compared to the current time. When a predetermined time elapses, the PCI server 48 assumes that the subscriber is out of radio coverage or has quit the PCI application.

For implicit (or automatic) deregistration, the message flow is the same as illustrated in FIG. 13. The PCI server 48 sends to the PDA 30 a deregistration request containing registration information about the subscriber. The PCI server 48 also sets a timer during which it will wait for a response from the PDA 30. When the PDA 30 receives the deregistration request, it responds with registration acknowledgement which contains the registration information currently known to PDA. When the PCI server 48 receives the registration acknowledgement, it updates the subscriber's registration status based on information in the acknowledgement. The PCI server 48 also updates the wireless messaging time-stamp associated with the subscriber to the current time. If the PCI server 48 does not receive an acknowledgement within a predetermined time as described above, the PCI server 48 assumes that the subscriber is no longer registered and removes all references to the subscriber from the service profile cache 51.

Sending and receiving e-mail wireless messages involves two types of message flows: sending messages from the PDA 30 to the PCI server 48 and from the PCI server 48 to the PDA 30.

Figure 14:
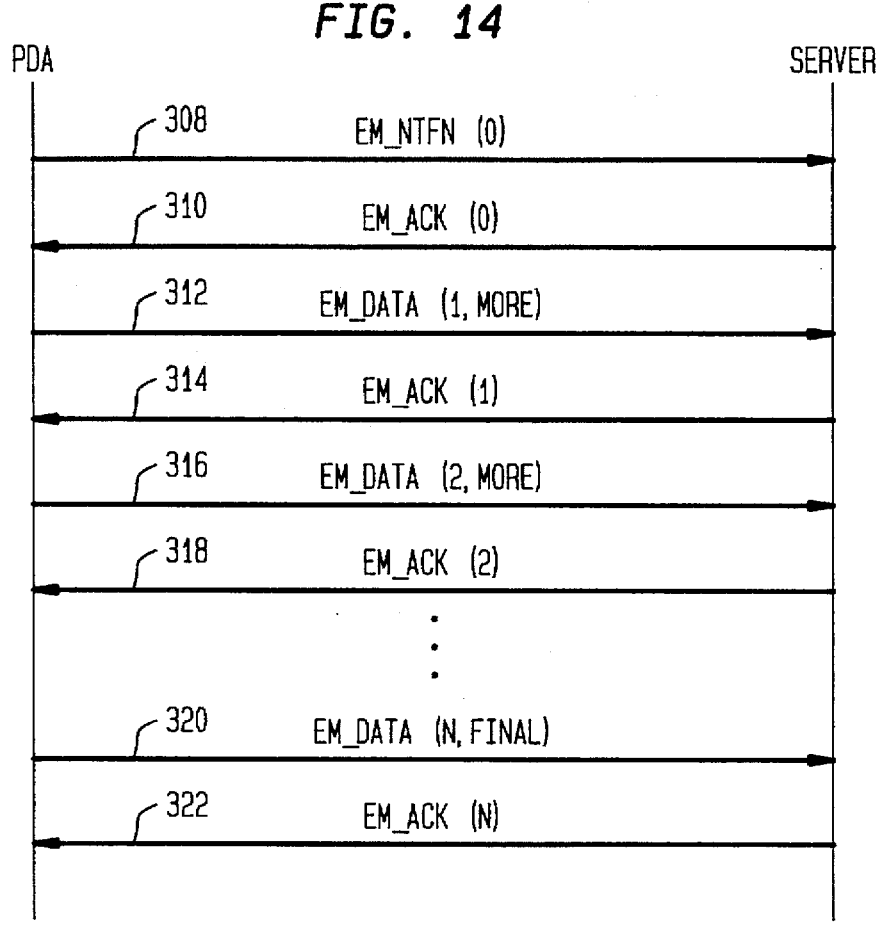

FIG. 14 is an illustrative example of a message flow sending an e-mail from a PDA 30 to a PCI server 48. When a subscriber sends an e-mail notification from the PDA 30, the PDA 30 forwards the e-mail notification to the PCI server 48. The body of the e-mail contains, for example, "to;from;subject;cc" information (line 308). The PCI server acknowledges this notification (line 310). If the e-mail is longer than can be transmitted in a single message, the PDA 30 segments the e-mail into multiple, sequentially numbered packets and sends them to the PCI server (lines 312, 316, 320). Each packet sent from the PDA is responded to with an acknowledgement containing the reception status of the message and the sequence number it is acknowledging (lines 314, 318, 322). The PDA 30 and PCI server 38 use the sequence number to maintain a sequential flow of packets. Out of sequence packets are discarded. Once all of the packets are received, the PCI server 48 puts them into their original order using the sequence number and forwards the now assembled e-mail to a message transfer agent, which then forwards the e-mail to its intended destination.

The PDA 30 starts a timer each time it sends out an e-mail. If the PDA 30 does not receive an acknowledgement after a predetermined time (for example ten seconds), the send operation is aborted and the e-mail is stored in a local outbound queue for redelivery in the future.

When an e-mail is being delivered from an PCI server 48 to a PDA 30, a similar message flow is used. The only difference is that the PCI server 48 initiates the flow and sends the initial messages instead of the PDA 30.

Retrieving e-mail involves two types of message flows: retrieving undelivered e-mail addressed to the PDA 30 and retrieving e-mail delivered a messaging system, such as a wireline e-mail system. When a subscriber is out of radio coverage or is not registered with PCI, the PCI sends e-mails addressed to be delivered to the PDA (PDA-bound e-mail) to an external mail storage system. The PCI server will also send certain e-mail directly to an external mail storage system (MS-bound e-mail), such as the subscriber's wireline e-mail connected to his or her personal computer, according to the subscriber profile stored in the PCI database A registered subscriber can retrieve PDA 30 bound e-mail at any time by starting "FETCH" operation. The PCI will send the PDA bound mail from the external mail storage and will also summarize MS-bound e-mail.

Figure 15A:
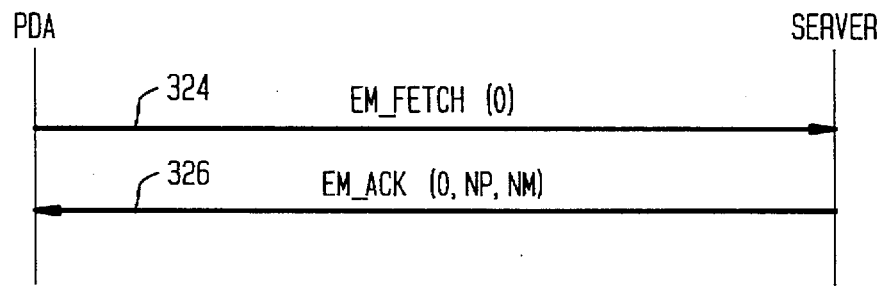

An illustrative example of the message flow between the PDA and the PCI server for retrieving undelivered PDA bound e-mail is shown in FIGS. 15(a) and (b). If there are no MS-bound messages, an illustrative message flow is shown in FIG. 15(a). The PDA 30 sends a fetch request to the PCI server 48 (line 324) and starts a timer, which waits for an acknowledgement. If no acknowledgement is received within a predetermined time, for example twelve seconds, the PDA 30 assumes it is out of radio coverage and informs the subscriber to try again later. In response to the request, the PCI server 48 logs into an external mail storage system specified in the subscriber's profile. If any PDA-bound e-mail is stored in the external storage system, the PCI server 48 will (a) move the PDA bound e-mail from the external mail storage system into a pending to a in the PCI server; (b) send an acknowledgement to the PDA indicating the number of PDA bound e-mail now residing in the pending area; and (c) initiate delivery of these PDA bound e-mail from the pending area to the PDA (line 326).

Figure 15B:
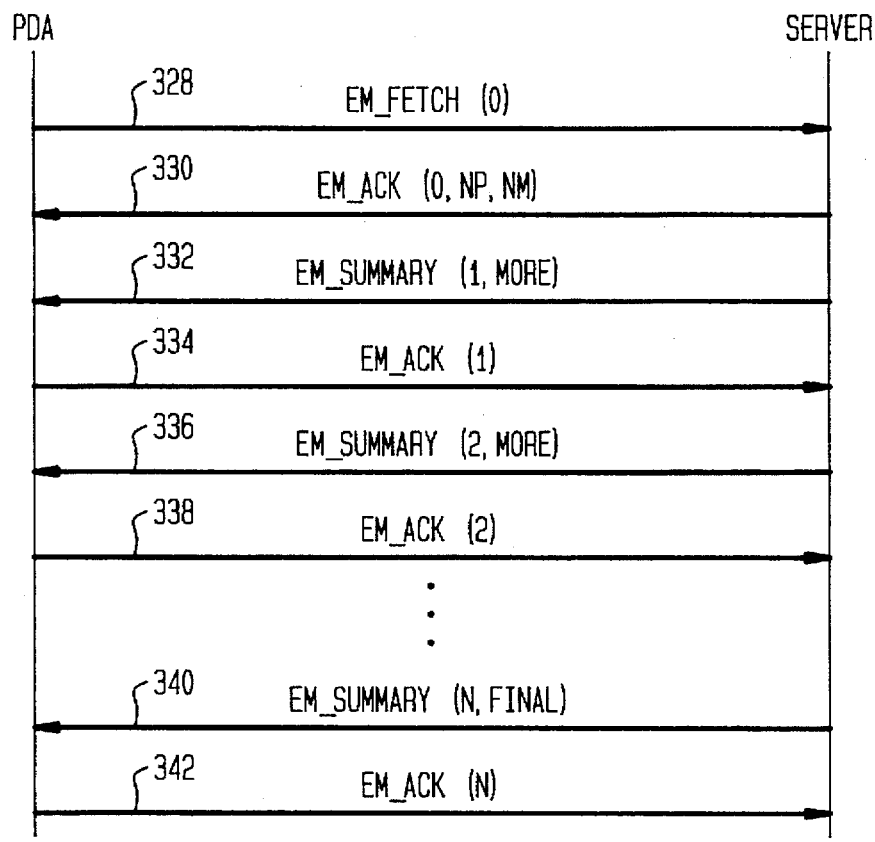

If there are MS-bound e-mail messages, an illustrative message flow is shown in FIG. 15(b). The PDA sends a fetch request (line 328) and starts a timer, Whenever the PCI server sends a summary message, it starts a timer. If the PCI server 48 does not receive an acknowledgement within a certain predetermined time, for example ten seconds, it will assume that the PDA 30 is out of radio coverage, abort the send operation, and discard the summary information. In response to the request, the PCI server 48 will (a) send an acknowledgement to the PDA indicating the number of MS-bound e-mail present (line 330); (b) extract summary information from those messages; and (c) send the summary to the subscriber's PDA (line 332). When the PDA receives an acknowledgement from the PCI server, it informs the subscriber based on the contents.

Summary information for the MS-bound e-mail is formatted into one ASCII text per e-mail and sent to the PDA. If the summary information, or the number of summarized e-mail require more than one message, the PCI server 48 splits the summary information into multiple, sequentially numbered segments and sends each segment in a separate message (lines 336, 340). Each message from the PCI server 48 is responded to by the PCI server with an acknowledgement containing the reception status of the message and the sequence number it is acknowledging (lines 334, 338, 342). Out of sequence messages are discarded. Once all of the packets are received, the PDA 30 puts them into their original order using the sequence number.

Figure 16:
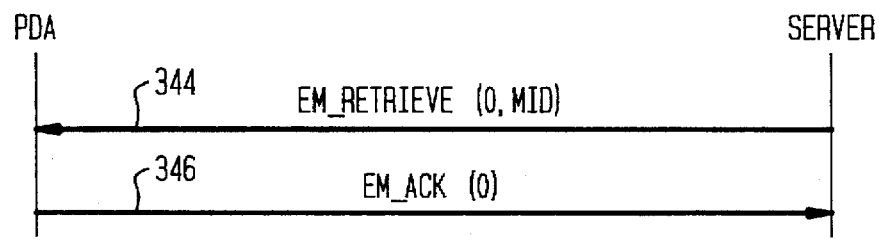

Once the summary information describing the MS-bound e-mail messages is reviewed, the subscriber may start a FETCH operation to retrieve these MS-bound e-mail messages. FIG. 16 is an illustrative example of a message flow between the PDA 30 and the PCI server 48 retrieving MS-bound e-mail. The subscriber selects an MS-bound e-mail message to be received. The PDA 30 sends a retrieve request to the PCI server 48 containing the message selected by the subscriber (line 344). The PCI server 48 responds with an acknowledgement (line 346). The PCI server 48 logs into the external message storing system specified in the subscriber's service profile and moves the MS-bound e-mail specified in the request out of the storage system into a pending area in the PCI server 48. The PCI server 48 initiates a send operation which delivers the e-mail in the same manner as discussed above.

Cross media notification (e.g., PDA notification of voice mail message receipt) is sent to the PDA 30 using the same delivery as a wireless e-mail message to the subscriber. The PCI server 48 originates the notification e-mail and the e-mail subject is "message notification". The body of the notification e-mail contains the message sender's address (i.e., the phone number for a voice mail), the date and time the message arrived at the PCI; the type of media, (i.e., voice mail, FAX, e-mail or other); whether the message is marked urgent (if detectable); the length of the message (for example, in minutes for a voice mail message); and, if appropriate, the subject of the message.

Profile management allows the subscriber to modify wireless messaging and CallCommand services by updating certain elements in the subscriber's service profile stored in the PCI database 44 and the service profile cache 51 in the PCI server 48. Profile information is not stored locally on a PDA 30. Updating the subscriber's profile using a PDA 30 always requires the subscriber to have a profile download from the PCI.

Figure 17:
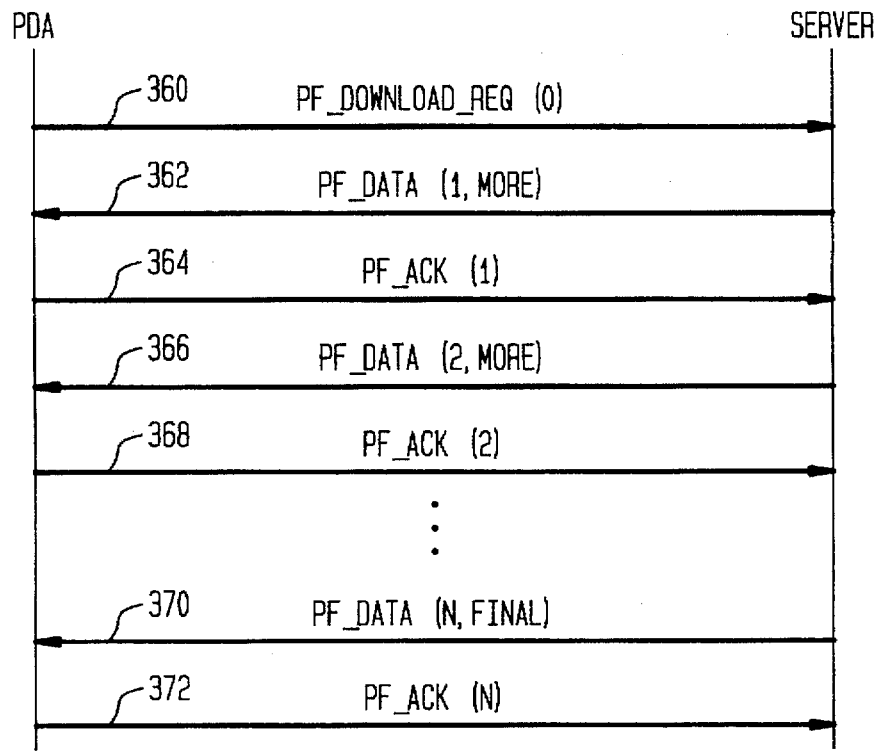

Profile management involves two types of message flows, profile download and profile upload. FIG. 17 is an illustrative example of the message flow between the PDA 30 and the PCI server 48 for a profile download. As indicated above, any profile change requires a profile download because the profile is never stored in the PDA 30. A subscriber starts a profile management application on a PDA 30 and requests a profile download. The PDA 30 sends a download request to the PCI server and requests a copy of the subscriber's modifiable profile elements to be downloaded to the PDA 30 (line 360). The PCI validates the identity of the subscriber through its subscriber ID and password. If the subscriber's identity is not validated, the PCI sends an acknowledgement and an error code and terminates the profile update session. If the subscriber's identity is validated, the PCI downloads the subscriber's modifiable profile elements (lines 362, 366, 370). Attached as Appendix C is a list of tags for modifiable profile elements. The PDA 30 acknowledges the received data (lines 364, 368, 372). The PDA starts a timer after sending the download request. If the PDA does not receive an acknowledgement or data from the PCI server within a predetermined amount of time, for example, ten seconds, it assumes that it is out of radio coverage and informs the subscriber to try again later. The PCI server 48 starts a timer each time it sends out data to the PDA 30. If the PCI server 48 does not receive an acknowledgement from the PDA 30 within a predetermined time, for example ten seconds, it will abort the profile download operation.

Figure 18A:
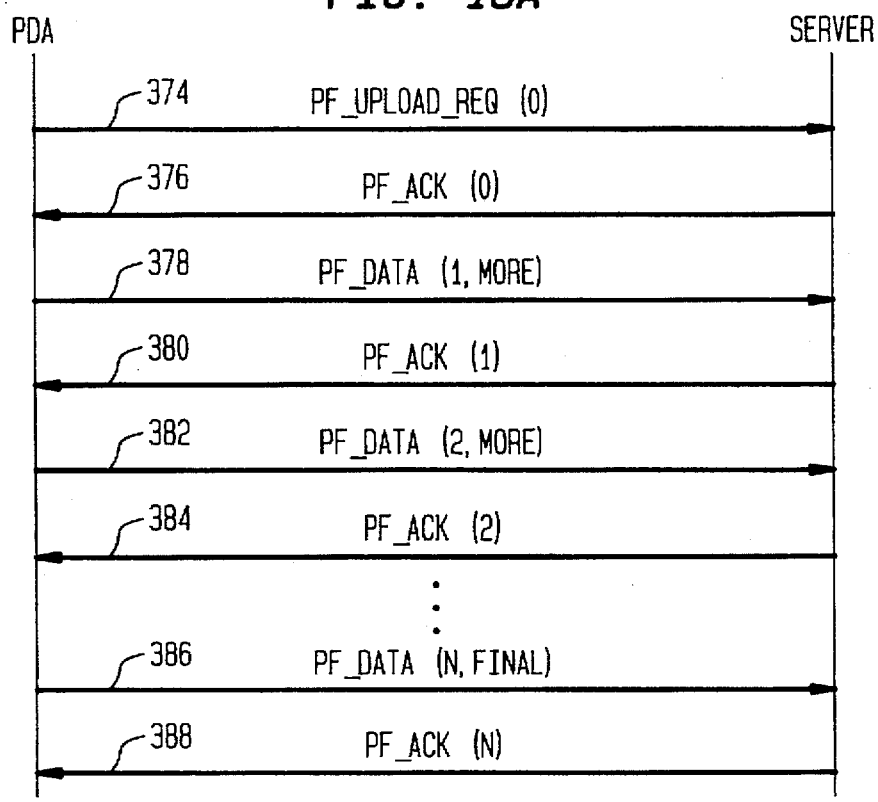

Once the subscriber finishes editing the profile on the PDA, a profile upload request is issued. An illustrative example of the message flow between the PDA 30 and the PCI server 48 for a profile upload is shown in FIGS. 18(a) and (b). After the subscriber issues a profile upload request, the PDA 30 sends an upload request to the PCI server 48 requesting permission to send the updated profile elements (step 374). The PCI server 48 validates the identity of the subscriber, for example by checking the subscriber ID and password, and checks if there is an associated download request issued by the same subscriber. The check for an associated previous download request is necessary so that the PCI server 48 is sure that the profile the subscriber wants to change is the profile that the PCI server 48 has just sent. If the subscriber's identity is not validated, or there is no associated download request packet, the PCI server sends an error code to the PDA 30 and terminates the profile update session. If the subscriber's identity is validated and there is an associated download request, the PCI server 48 honors the request by sending an acknowledgement and a status code of "OK" to the PDA 30 (line 376). When the PDA 30 receives the OK, it formats the updated profile elements and sends them to the PCI server 48 in the same way the profile was sent to the PDA 30 during the download phase (lines 378–386). If no error is detected, the PCI server 48 sends the updated profile elements to the PCI database 44 to commit the change. After a confirmation is received from the PCI database 44, the PCI server 48 sends an acknowledgement with status code of "OK" to the PDA to confirm and conclude the profile update session (line 388), as shown in FIG. 18(a).

Figure 18B:
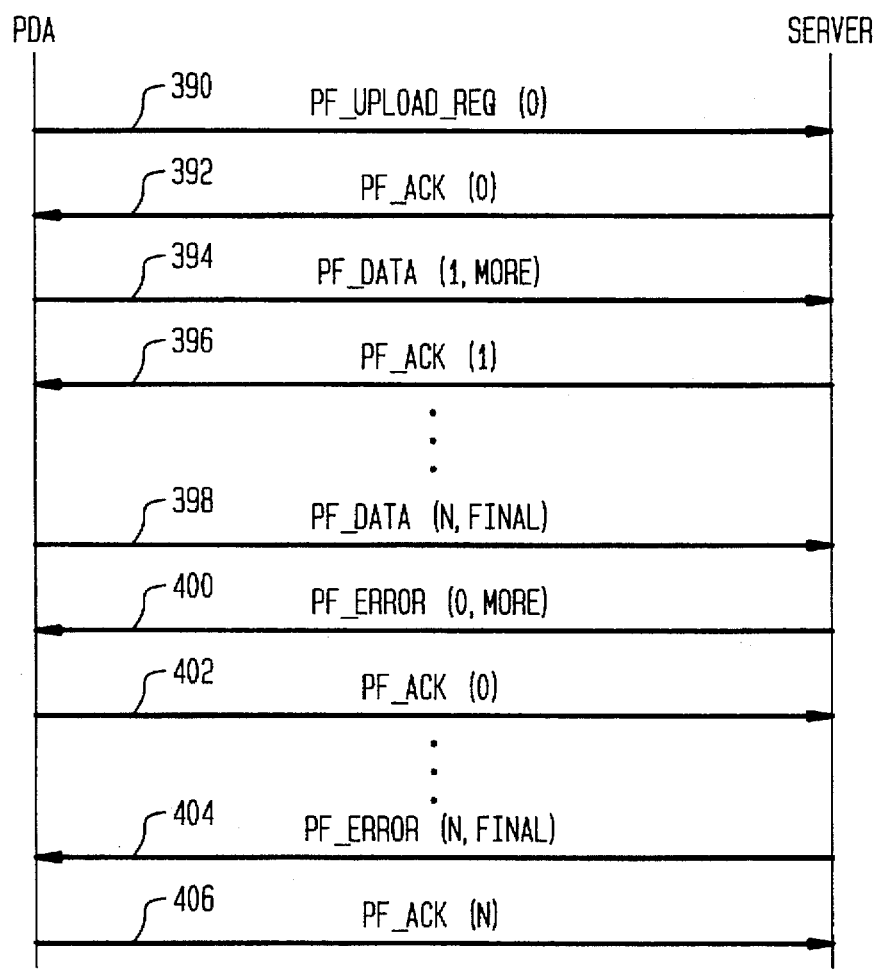

FIG. 18(b) is an illustrative message flow when the PCI server 48 detects errors in an uploaded profile. The upload proceeds as above (lines 390–398). If the PCI server 48 detects errors in the updated profile elements it responds with an error message to notify the subscriber about the invalid profile element (line 400). The PDA acknowledges receipt of the error message (line 402). The PCI server 48 sends the invalid profile elements in a similar way as the profile was sent to the PDA 30 during the download phase (lines 404, 406).

The PDA 30 starts a timer when its sends out an upload request or sends out data. If the PDA 30 does not receive an acknowledgement from the PCI server 48 within a certain predetermined time, it will abort the profile upload operation and inform the subscriber to retry at a later time.

V. Wireless E-mail Messaging Services

PCI includes several wireless text message sending, receiving, and service control features. PCI's wireless text messaging services are based on three network-based capabilities:

- message integration combining voice message notification, voice mail, telephone calls, e-mail, and fax;
- message routing and delivery, i.e., the PCI is a wireless and wireline network gateway;
- database access, i.e., subscriber profile, authentication, and validation.

The PCI uses personal communications service integration capabilities to integrate the wireless service capabilities available to the subscriber. This is accomplished by providing the subscriber with control over the message routing and delivery by the subscriber accessible "subscriber profile" stored in the PCI. The subscriber profile contains subscriber programmed instructions on message receipt, origination, and notification. Thus, PCI operates as a messaging gateway for providing access to multiple wireline and wireless networks, while using subscriber profile information to control sending and receiving options. PCI allows wireless service providers to integrate the voice messaging, e-mail, and fax message services for one subscriber through a single telephone number. Thus, one phone number may provide a single link between the service provider and the subscriber's voice and data communications lines.

The message sending features include communications across disparate networks and broadcast communications. A subscriber may send voice mail, e-mail, and fax messages between different service providers and networks. A subscriber may also send broadcast e-mail and fax messages, which broadcasts may mix e-mail and fax messages within a single distribution list. For example, the subscriber may type a message on a PDA and send it to a distribution list over a wireless network. The distribution list may, for example, direct the PCI to deliver the message to the office as an e-mail and to a client as a fax.

The message receiving features include personal number addressing, selection of message receipt media format, selection of cross-media message notification, and selection of message screening and delivery options. A subscriber may receive voice (e.g., phone), voice mail notification, e-mail, and fax communications under a single personal telephone number. A subscriber may direct e-mail and fax delivery based on selected parameters, such as time-of-day, day-of-week, etc. A subscriber's media message notification, voice mail notification of e-mail or fax messages, e-mail notification of voice mail or fax messages, and fax notification of e-mail or voice mail messages may be delivered to the subscriber based on selected options and parameters.

Alternatively, if the subscriber's wireless terminal is not activated, e-mail messages may be automatically routed to alternate destinations as defined by the subscriber's profile. For example, the subscriber may not want to receive all telephone calls at a visiting location to avoid unnecessary interruptions and unwanted incoming call charges. The subscriber directs the PCI to send notification of phone calls to the pager and to route the call to voice mail. Once notified, the user can determine from the phone number included in the pager notification whether to call the person directly, check voice mail, or ignore the call until a later time. The subscriber may also direct which messages are to be routed to the subscriber's current serving network, which are to be sent to another network, and what media is to be used to receive certain messages. The subscriber may also designate, for example, that if the wireless terminal is off, all text messages to be sent to e-mail and all voice messages are to be sent to voice mail.

The PCI service control features include supporting subscriber profile management, supporting personal mobility across wireless and wireline networks, and supporting wireless terminal mobility. A subscriber's profile may be updated by sending text messages from a PDA over a wireless network or DTMF (touch-tone) messages from either a wireline or wireless terminal. The subscriber may program the profile to select media for receiving and sending information; select cross media for message notification; select message screening and delivery options; select single voice mailbox storage (for subscriber's with more than one voice mailbox); and select a PCI service password. All of these options may be maintained over wireless or wireline terminals. The subscriber may automatically register and deregister a wireless terminal thus updating the subscriber's profile to receive or reroute messages as preprogrammed in the profile.

The wireless data network provides data transport between the PCI server 48 and the subscriber using a wireless data terminal, such as a PDA 48. The wireless data network may connect to the PCI server in a variety of ways, using a variety of protocols. For example, the wireless data network may connect to the PCI using a leased line and run a proprietary protocol to connect the PCI server via standardized protocols such as TCP/IP.

Text messaging systems may be connected to the PCI server through for example, Frame Relay, SMDS, ISDN, leased line interface, or other transport mechanism effective for supporting data communications may be used. An inter-message handling system protocol, such as X.400 (in which case X.400 gateway conversion is needed), or Internet SMTP or other protocols supported by an interworking unit terminating the data transport interface, may be used to forward messages between the PCI server 48 and the system accessing the PCI.

The PCI server will preferably support sending and receiving faxes in the T.434 format. The PCI server may also preferably support sending and receiving faxes using the simple mail transfer protocol (SMTP) supported by the TCP/IP transport protocol.

FIG. 19 shows an illustrative embodiment of a PCI service which supports text messaging systems. In this example, a subscriber has a personal computer 402 at the office connected to a local area network (LAN) 414 and an enterprise text messaging system (for example, a local network e-mail) 413, a personal computer at home 416, and a wireless terminal, such as PDA 30 that may send and receive messages. All of these devices are connected to the PCI. For example, the subscriber's home personal computer 41 6 may be connected to the PCI 40 via a modem and a wireline data network 418 over either a PSTN or ISDN.

Persons connected to the LAN may send text messages to the subscriber by using the local text messaging system without using the PCI. That is, the user of computer 420 can send an e-mail to the subscriber's office computer 412 without entering the PCI node 40. Because the enterprise text messaging system 413 is connected to PCI, all enterprise messaging users may send messages to and receive messages from all PCI subscribers (including those not connected to the local text messaging system 413) by using an appropriate PCI address.

A person connected to a different enterprise messaging system, such as a second text message handling system 422, can send messages to the subscriber on the first message handling system 413 by routing the message through the PCI Server 48.

PCI subscribers are assigned a single personal telephone for both voice and data communication. For example, an E.164 address (i.e., a telephone number) may be assigned to a PCI subscriber to use as the single PCI address. These phone numbers may be geographically based according to current PSTN architecture, but it is also possible to use portable universal numbers. Fifteen digit number formats may be desirable to permit sub-addressing. For example, a message destined for a PCI subscriber may be addressed to the subscriber's telephone number, e.g., 201-555-5555. If an originating mail system such as a LAN mail system or third party message handling system requires a domain identifier, the originator may have to specify 201-555-5555 @ PCI, or on the Internet 201-555-5555 @ pci.net. When the PCI server 48 receives the message, it will look at the subscriber's profile stored in the call process request database 222 stored in a PCI database 44 to determine how to handle the incoming message. An example of a few of the options that PCI may provide for the subscriber are to:

send the message to the subscriber's wireless PDA;

send the message to the subscriber's wireline computer at home;

send the message to the destination text messaging system at the office;

send a notification of an incoming message to the wireless data terminal and the actual message to the text messaging system;

send the message to any or all of the above;

The subscriber may send text messages over the wireless data network or wireline data network to the PCI server 48. The PCI server 48 consults with the subscriber's profile at the PCI database 44 and forwards the message to the appropriate destination, depending on the routing destination found in the profile. Text messaging systems not connected to the PCI 40 may send text messages to PCI subscribers by using another network connected between the sender's text messaging system and the PCI subscriber's text messaging system, for example, the non-connected text message may be connected to a PCI over the Internet.

The flow for wireless messaging is now described.

The flow for a PCI subscriber receiving an e-mail message to a wireless PDA 30, for example, is as follows. An e-mail message is sent from a wireline or wireless sender to a PCI subscriber and arrives at the PCI server 48. The incoming e-mail contains a recipient address in the format of "201-555-5555 @ pci.net" where 201-555-5555 is the subscriber's ten-digit personal number and pci.net is the PCI server's domain name in the Internet.

The PCI server 48 checks the subscriber's service profile, either from the profile service cache 51 in the PCI server or by downloading the subscriber profile from the PCI database 44 into the cache 51 to determine how to process the e-mail message. The profile contains screening and routing information and cross media notification information. The PCI server 48 uses this information to send incoming email to an actual destination address that can be a wireless, wireline, or paging address using, for instance, the UDP/IP protocol over a wireless data network; the Internet SMTP protocol over the Internet wireline network; or the Telocater Alpha Numeric Protocol (TAP), respectively. In this case, the subscriber has programmed into the subscriber profile to have the e-mail sent to a PDA 30. The PCI server 48 receives the e-mail message and forwards it to the wireless data network programmed into the profile. The e-mail is transmitted over a wireless data network 39 for receipt by the PDA 30.

If the e-mail cannot be delivered, the PCI server returns the e-mail to the original sender with a short description of why the delivery was unsuccessful, using the SMTP protocol.

If an e-mail message is to be delivered to an alphanumeric paging address, the PCI server translates the e-mail message into a paging message and sends the paging message to the paging network specified in the subscriber profile. The protocol between the PCI server and the paging network is the Telocater Alphanumeric Protocol (TAP). The PCI server formats the paging message into a maximum page limit with a maximum number of characters per page. For example, the page limit may be two pages and a maximum of 256 characters per page. The PCI server does not verify whether a paging message is actually delivered by the paging service provider. It will, however, verify that the message was successfully sent to the paging service provider. Because the PCI server does not provide this verification, it is assumed that messages sent to a pager arrive successfully at the pager.

If the subscriber profile contains an option for voice message notification of e-mail messages, the PCI server generates and sends a digitized prerecorded voice announcement to the address specified in the subscriber service profile. The protocol used to deliver the voice message notification is the AMIS-Analog Protocol.

In this illustrative embodiment, a preferred PCI server node functions as an X.400 message transport agent or SMTP router and routes messages destined for PCI subscribers and to those destined for users connected on other systems. In the case of an X.400 message transfer agent (MTA), X.400 addresses are used to internally represent subscriber addresses. The translation from the "user friendly" subscriber addresses such as E.164 numbering to the X.400 address would be done via a look-up table (ROM or other memory device) at the PCI access module or the X.400 gateway. Destination or source addresses from users on other networks are not converted to X.400 addresses, but are left in the native address format of the sending or receiving system. An X.400 gateway address may be added to the message header, however, to allow PCI to route the message to an appropriate gateway.

The PCI server 48 is responsible for delivering a message to the subscriber listed in the destination field of the message. In a simple case, the subscriber has an X.400 or Internet mailbox accessible to the PCI via one of its access connections. Alternatively, the subscriber profile may contain forwarding addresses which route the message for delivery to unusual destinations. For example, the subscriber's mailbox may reside on another message handling system, a wireless data network, wireline data network, or PSTN destination associated with a fax machine. The delivery of such a message to a final destination is handled by an interworking unit which is responsible for doing address translation and, if necessary, format translation as defined by the subscriber profile entry.

For subject e-mail screening, the subject field is analyzed to determine if a match exists before comparing the address field. If the subject field matches an entry on the screening list, the treatment for a matched entry will occur. That means, in this illustrative embodiment, that subject screening takes precedence over address sender screening. That is, if e-mail originated from an address that is excluded from the e-mail screening address list, the e-mail will still be delivered according to the screening criteria.

If the PDA 30 is not registered for the wireless messaging service or if the PDA 30 is out of radio coverage at the time the message arrives at the PCI server 48, the message will be sent to the subscriber's external message storage system, such as the text message system 413.

VII. Message Flows

PCI wireless messaging involves three types of message flow. The first is sending a message from one subscriber to another, the second is receiving a message regardless of whether the subscriber is using a wireless or wireline terminal, and the third is sending a message to a non-subscriber.

FIG. 20 is an illustrative example of the message flow of a PCI wireless subscriber sending a message. The PCI user submits a message 502. The message is received by a message transfer agent in the PCI server. The MTA copies and temporarily stores the originating and destination addresses 504. The MTA sends to the mobility manager function in the PCI server a request to validate the sending user as a PCI subscriber 506. The mobility manager sends this validation request to the PCI database and waits for a response 508. Upon receipt of an affirmative validation from the PCI database, the mobility manager sends the validation response to the MTA 510, 512. The MTA then sends the mobility manager a request for the address of the user's home MTA 514. The mobility manager routes this request to the PCI database 516. Upon receipt of a response from the PCI database, the mobility manager routes the home MTA address to the MTA 518, 520. The MTA then routes the message to the home MTA 522. If a third party PCI database must be consulted, the home MTA request will be directed from the PCI database to a third party PCI database 524, 526.

FIG. 21 illustrates an example of the message flow of a wireless PCI user receiving a message. When the PCI receives a message from a subscriber, the MTA in the PCI server copies and temporarily stores the destination address and the message 530. The MTA sends to the mobility manager function in the PCI server a request for the PCI subscriber's user profile 532. The mobility manager will retrieve this profile request from the PCI database 534. (If a third party PCI database is involved, the local PCI database contacts the third party PCI database through a switch transfer point 536, 538.) Upon receipt of the subscriber's profile from the PCI database 540, the mobility manager requests the message from the MTA using a "message forward request" message 542. When the mobility manager receives the message from the MTA 544, the mobility manager processes the message as indicated by the subscriber's profile, which may involve media conversion or screening 546. After processing the message, the mobility manager sends the message to the MTA for delivery 548, 550. Alternatively, the PCI server mobility manager function may directly deliver the message to the termination receiver 552.

FIG. 22 illustrates an example of a message flow from a PCI wireless subscriber to a non-subscriber. When the MTA receives a message from a PCI subscriber 560, the MTA copies and temporarily stores the originating addresses and the message 562. The MTA sends the mobility manager a request to validate the originating address as a PCI subscriber 564. The mobility manager will send this validation request to the PCI database and wait for a response 566. When the mobility manager receives an affirmative validation response from the PCI database 568, the mobility manager sends the validation response to the MTA 570. Next, the mobility manager sends to the PCI database a request for the PCI subscriber's profile 572. Upon receipt of the subscriber's profile from the PCI database 574, the mobility manager requests the message from the MTA using a "message forward request" 576. Upon receipt of the message from the MTA 578, the mobility manager processes the message as indicated by the user's profile, which may require media conversion or obtaining the addresses for the distribution list for the message 580. After processing the message, the mobility manager sends the message to the MTA for delivery 582, 584. Alternatively, the MTA may directly deliver the message 586.

VIII. The PDA Application

To better understand the capabilities of PCI and PDA/PCI server interface, a discussion of the PDA user interface is helpful. The user interface is application software residing in the PDA. This software is described by describing the screens displayed on a PCI subscriber's PDA screen. The following discussion is for an illustrative embodiment of the PDA user interface. A person skilled in the art recognizes that the interface may be implemented in a myriad of ways.

Figure 23:
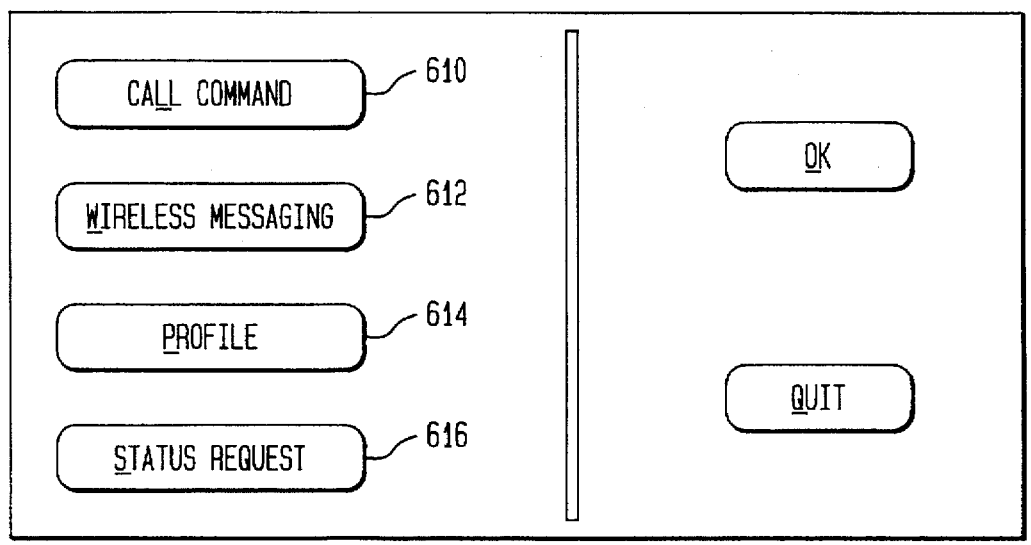
FIGS. 23, 24, 25, 26, 27, 28, 29, and 30 illustrate exemplary screens displayed to a PCI subscriber using a wireless PDA.

FIG. 23 is an illustrative example of a PDA user interface main menu. The menu allows the user to enter the CallCommand or wireless messaging services, update the user profile, or check the status of the system by clicking on buttons 610, 612, 614, 616, respectively.

Figure 24:
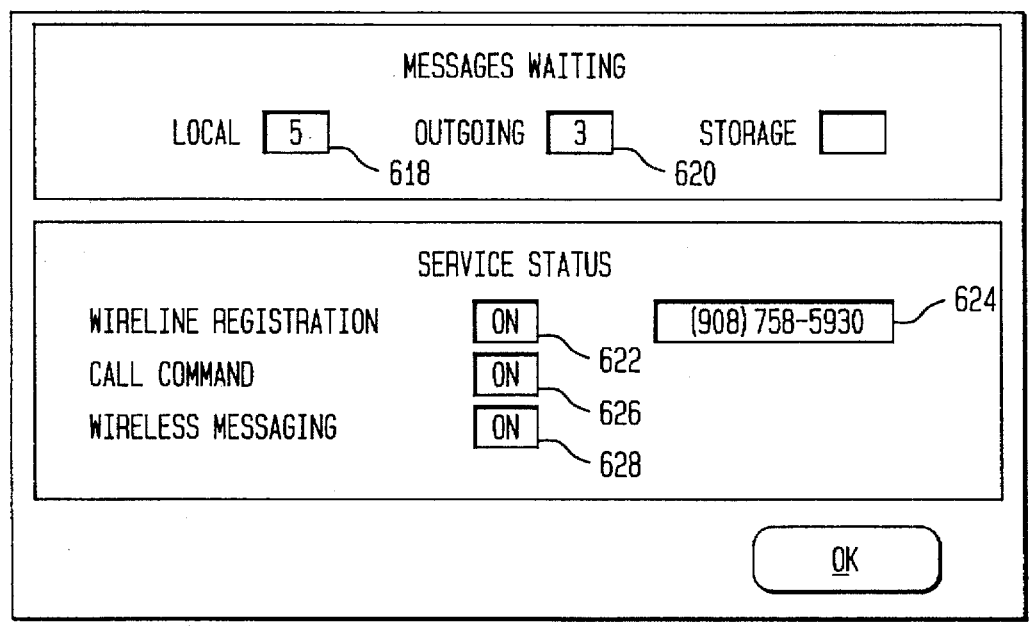
Figure 29:
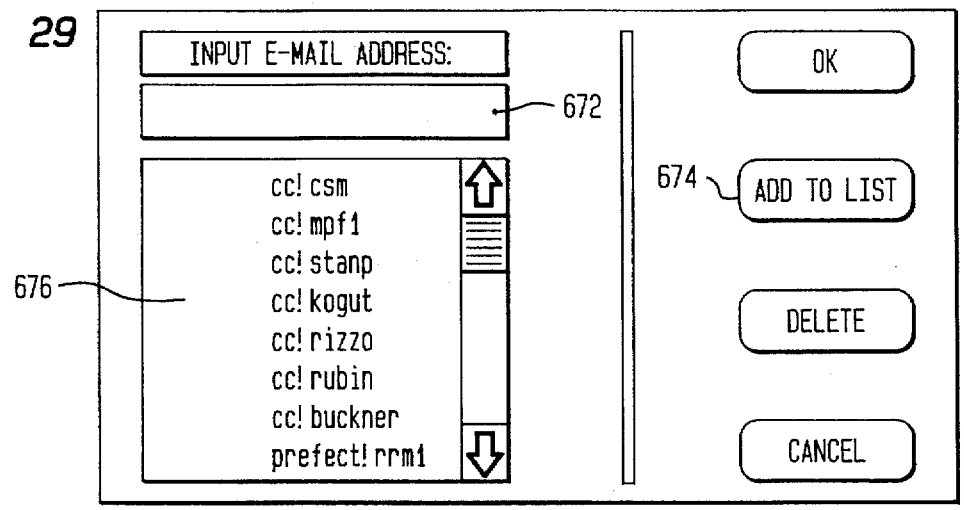

FIG. 24 shows a computer screen after "status request" 616 is selected. The status request screen shows that there are five local originating messages (waiting to be sent by the PDA) and three outgoing messages (waiting to be retrieved) in boxes 618, 620, respectively. The various services' status is also displayed. As seen in FIG. 29, this subscriber's wireline registration is on, as seen in box 622. This registers the subscriber on a particular wireline telephone, seen in box 624. This registration will direct calls to this phone number. The status request also advises this subscriber about the status of the CallCommand and wireless messaging features, as seen in boxes 626, 628.

Figure 25:
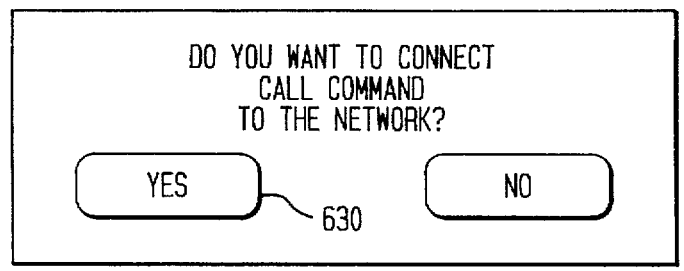

FIG. 25 is an illustrative example of a screen if the subscriber selected "Wireless Messaging" 512 on the main menu (FIG. 23). The subscriber will be connected to the wireless messaging service if "YES" 642 is clicked.

Figure 26:
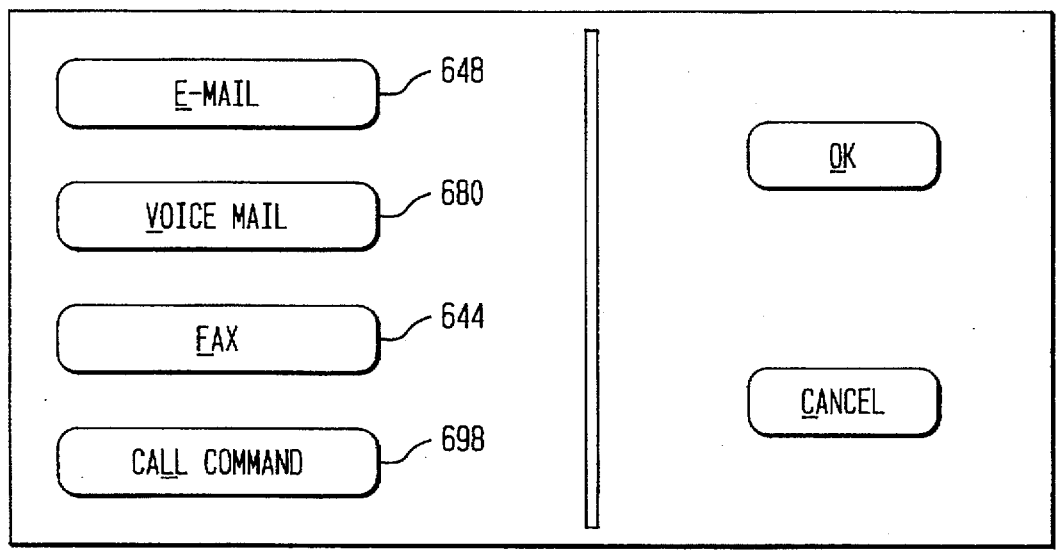
Figure 27:
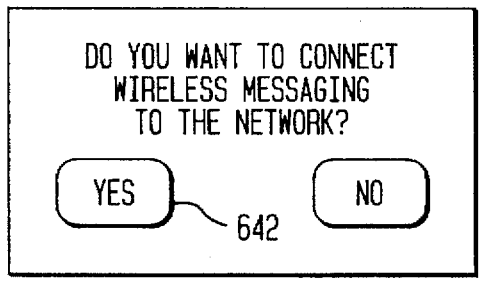

FIG. 26 is an example of a screen which may appear if the subscriber selected "Profile" 614 from the main menu (FIG. 23). If the subscriber selects "Fax" 644 from this screen, a screen such as that shown in FIG. 27 may appear, which allows the subscriber to enter a phone number into box 646 to which faxes will be directed. Turning on e-mail screening activates both the subject and address screening. Subject screening takes priority over address screening parameters.

Figure 28:
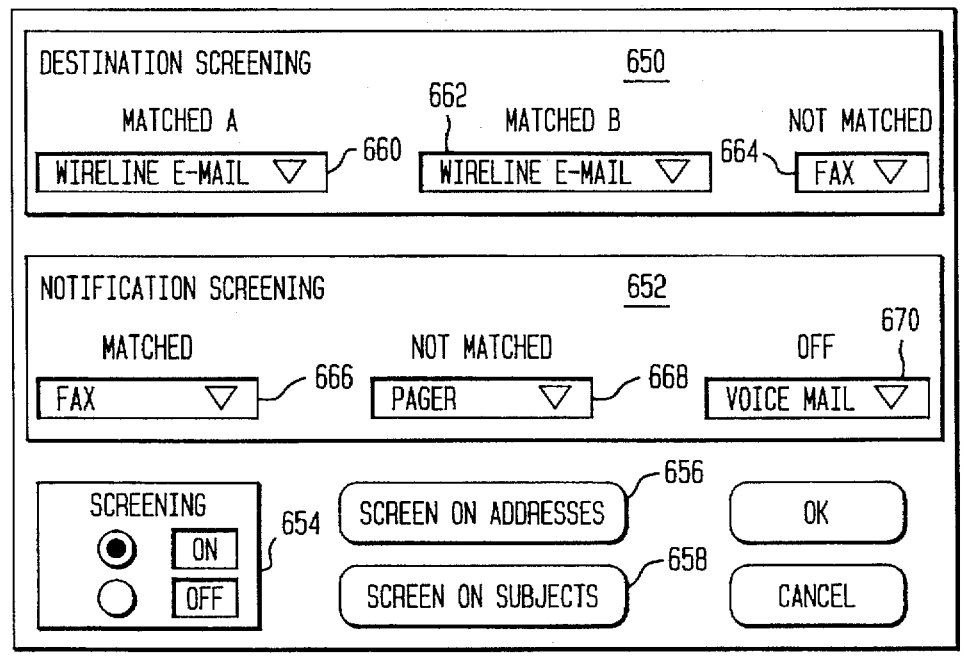

If the subscriber selected "e-mail" 648 on the screen FIG. 26, a screen such seen in FIG. 28 appears. The subscriber can select where e-mail messages should be delivered (destination screening) 650, where notification of e-mail receipt should be delivered (notification screening) 652, whether messages should be screened at all 654 and, if so, how they should be screened 656, 658.

The destination 650 allows the subscriber to select destinations for incoming e-mail. Messages that satisfy the screening requirement may be sent to two destinations (match A, match B). As shown in this illustrative example, e-mail received which match the subscriber's preprogrammed screening criteria are to be delivered only to a wireline e-mail, such as the subscriber's personal computer at the office, because match A 660 and match B 662 designate the same destination. All received e-mail messages which do not meet either criteria ("not matched") are sent to a selected fax machine 664, for example, the fax machine at the subscriber's office.

The subscriber also indicates where notification of a received e-mail should be sent 652. Notification for all e-mail messages meeting the screening requirement should be sent to a selected fax machine 666. The PCI network will select information about the e-mail origination such as the author, recipient, and subject matter and convert it to a facsimile format and send the message to a fax machine. Notification of all e-mail that does not meet the screening criteria are sent to a pager 668. The PCI network will take the originating message information and turn it into alphanumeric information according to the TAP protocol and send it to the subscriber's pager. If the screening option is turned off, notification of all incoming e-mail is sent to voicemail 670. The PCI network will convert the origination information from text to synthesized speech and send the information to a selected voice mailbox.

The user may also select whether to screen incoming e-mail messages at all 654. If the screening is on, the user may screen e-mail based on the originating address 656 or subject matter 658.

FIG. 29 is an illustrative screen which the subscriber may use to edit e-mail screening according to address by clicking box 656 (FIG. 28). The subscriber may input new e-mail addressees into box 672 and add them to a list by clicking a box 674 or select addresses already entered to be included in a screening criteria as seen in box 676. For example, the user may want e-mail messages originating from the following addresses to be routed according to the screening criteria: cc!stanp, cc!rizzo, and cc!rupin. E-mail messages originating from these addresses will be routed and notified according to the criteria selected on the screen illustrated in FIG. 28.

Figure 30:
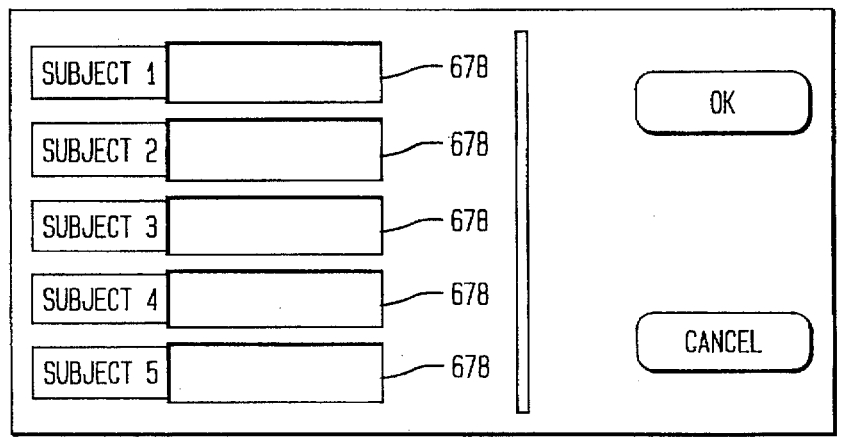

If the user selected to edit the "subject" a screening criteria based on "subjects" by clicking box 658 (FIG. 28), a screen such as that illustrated in FIG. 30 is presented. The user may type in to boxes 678 particular subjects which should be routed according to a screening criteria. The subject will search the incoming e-mail origination information to determine the subject of the e-mail. Subjects may include "urgent", "personal", the name of a client or project, etc.

IX. Billing

Billing operations is supported by an Automatic Message Accounting Network Function. The automatic network accounting measures, collects, formats and outputs network usage information to upstream billing and other operation application and service purposes. Preferably, automatic message accounting data is collected at various stages of service flows across network equipment and services.

X. Conclusion

An improved e-mail system is described with provides enhanced delivery and notification options and profile update capabilities.

While the invention has been described by the reference to specific embodiments, this was for purposes of illustration only and should not be construed to limit the spirit or the scope of the invention.

APPENDIX 1

Glossary of Acronyms

| | |
|---|---|
| AIN | advanced intelligent network |
| ANI | automatic number identification |
| APS | alphanumerical paging server |
| ATM | asynchronous transfer mode |
| CC | CallCommand |
| CCDB | call contact database |
| CO | central office |
| CPE | consumer premises equipment |
| CPR | call process request |
| D&R | data and report database |
| DRS | data and report subdivision |
| DTMF | dual tone multiple frequency |
| GDI | generic data interface |
| HLR | home location register |
| IP | intelligent peripheral |

APPENDIX 1-continued

Glossary of Acronyms

| | |
|---|---|
| IPI | intelligent peripheral interface |
| ISDN | integrated signaling digital networks |
| LEC | local exchange carrier |
| MOC | maintenance and operation console |
| MSAP | multiple services application platform |
| MTA | message transfer agent |
| PCI | personal communications internetwork |
| PDA | personal digital assistant |
| POP | post office protocol |
| PPSN | public packet switched network |
| PSTN | public switched telephone network |
| SMDS | switched multimegabit digital service |
| SMS | service management system |
| SNI | service network interface |
| SPACE ® | service provisioning and creation environment |
| SPC | service profile cache |
| SSP AT | service switching point access-tandem |
| TAP | telocator alphanumeric protocol |
| TCAP | transaction capable application program |
| TCP | transaction capable processing |
| VLR | visiting location register |

APPENDIX 2

| PCI Profile Element | GDI Tag ID | Type and Max Length |
|---|---|---|
| Personal Data (1) | | |
| Subscriber ID Number | 1 | d10 |
| Password | 2 | c8 |
| E-mail Address | 3 | c32* |
| V-Mail System Phone Number | 4 | d10 |
| V-Mail System Mailbox Number | 5 | d10 |
| Paging Terminal Phone Number | 6 | d10 |
| Paging PIN | 7 | c8 |
| Mail Storage Account ID | 8 | c32* |
| Mail Storage Password | 9 | c8 |
| Wireless Provider Subscriber ID | 10 | c10 |
| Wireless Voice Phone Number | 11 | d10 |
| Fax Number | 12 | d10 |
| Profile Version Number | 13 | n4 |
| Call Command Service Profile (2) | | |
| Call Command Registration Status | 21 | c1 |
| Wireline Registration Number | 22 | d10 |
| E-Mail Routing (3) | | |
| Primary Destination 1 | 31 | c1 |
| Primary Destination 2 | 32 | c1 |
| Primary Notification 1 | 33 | c1 |
| Secondary Destination | 34 | c1 |
| Secondary Notification | 35 | c1 |
| Default Destination | 36 | c1 |
| Default Notification | 37 | c1 |
| E-Mail Subject Screening (4) | | |
| E-Mail Screening Status | 41 | c1 |
| Subject1 | 42 | c1 |
| Subject2 | 43 | c1 |
| Subject3 | 44 | c1 |
| Subject4 | 45 | c1 |
| Subject5 | 46 | c1 |
| E-Mail From Screening (5) | | |
| E-Mail Screening Status | 41 | c1 |
| From1 | 52 | c12 |
| From2 | 53 | c12 |
| From3 | 54 | c12 |
| From4 | 55 | c12 |
| From5 | 56 | c12 |
| From6 | 57 | c12 |
| From7 | 58 | c12 |
| From8 | 59 | c12 |

APPENDIX 2-continued

| | | |
|---|---|---|
| From9 | 60 | c12 |
| From10 | 61 | c12 |
| From11 | 62 | c12 |
| From12 | 63 | c12 |
| From13 | 64 | c12 |
| From14 | 65 | c12 |
| From15 | 66 | c12 |
| Voice Mail Profile (6) | | |
| V-Mail Screening Status | 71 | c1 |
| From1 | 72 | c12 |
| From2 | 73 | c12 |
| From3 | 74 | c12 |
| From4 | 75 | c12 |
| From5 | 76 | c12 |
| Primary Destination | 77 | c1 |
| Primary Notification 1 | 78 | c1 |
| Secondary Destination | 79 | c1 |
| Secondary Notification | 80 | c1 |
| Default Destination | 81 | c1 |
| Default Notification | 82 | c1 |

APPENDIX 3

| Tag | Description |
|---|---|
| 001 | Password for subscriber registration |
| 002 | Password for retrieval of messages from message store |
| 003 | FAX Machine Number |
| 004 | Call Command Status flag (1 = ON and 0 = OFF) |
| 005 | Wireline Registration Number for remote call forwarding |
| 006 | E-mail screening status flag (1 = ON and 0 = OFF) |
| 007–021 | E-mail "From" screening 1 through 15 |
| 022–026 | E-mail "Subject" screening 1 through 5 |
| 027 | E-mail Destination A - Screening Criteria Match |
| 028 | E-mail Destination B - Screening Criteria Match |
| 029 | E-mail Notification - Screening Criteria Match |
| 030 | E-mail Destination - Screening Criteria Not Match |
| 031 | E-mail Notification - Screening Criteria Not Match |
| 032 | E-mail Notification - Screening OFF |
| 033 | Voice-mail Screening Status Flag (1 = ON and 0 = OFF) |
| 034–038 | Voice-mail "From" Screening 1 through 5 |
| 039 | Voice-mail "Urgent" Flag (1 = ON and 0 = OFF) |
| 040 | Voice-mail Notification - Screening Criteria Match |
| 041 | Voice-mail Notification - Screening Criteria Not Match |
| 042 | Voice-mail Notification - Screening OFF |

We claim:

1. A communication system comprising a plurality of wireless subscribers each having a single address to which electronic mail messages and fax, pages, and voice communications may be sent;

means for storing a profile for each wireless subscriber, said profile containing for each of said wireless subscribers for (1) screening information for selectively screening incoming messages based on at least one of message origin, time of day, and day of week; (2) routing information for transmitting the message to the subscriber or for returning the electronic message to the sender with a short description of why delivery was unsuccessful: (3) and cross-media notification information for translating the electronic message into a paging message to be sent to a paging network and for sending a voice message notification of the electronic mail message; and means for receiving an electronic mail message addressed to one of said subscribers and responsive to the information in said profile for said one subscriber for causing one of (1) delivering the electronic mail message to said one subscriber; (2) returning the electronic mail message to its sender with a short description of why delivery was unsuccessful if the electronic mail message cannot be delivered to said one subscriber; (3) translating the electronic mail message to a paging message and delivering the paging message to a paging network if the electronic mail message is to be delivered to a paging address; and (4) sending a voice announcement to the address specified in said one subscriber's profile.

2. A method for receiving an electronic mail message from a sender addressed to a wireless terminal at the same telephone number to which fax, pages, and voice communications may be sent, said method comprising the steps of:

determining from a pre-stored profile for the user how to process the electronic mail message, the profile containing (1) screening information for selectively screening incoming messages based on at least one of message origin, time of day, and day of week; (2) routing information for transmitting the message to the user or for returning the electronic message to the sender with a short description of why delivery was unsuccessful; (3) and cross-media notification information for translating the electronic mail message into a paging message to be sent to a paging network and for sending a voice message notification of the electronic mail message;

and, responsive to said determining step, causing the message to be delivered to a forwarding address different from the address of the user's wireless terminal.

3. The method for receiving an electronic mail message from a sender addressed to a wireless terminal at the same telephone number to which fax, pages, and voice communications may be sent, said method comprising the steps of:

determining from a pre-stored profile for the user how to process the electronic mail message, the profile containing (1) screening information for selectively screening incoming messages based on at least one of message origin, time of day, and day of week; (2) routing information for transmitting the message to the user or for returning the electronic message to the sender with a short description of why delivery was unsuccessful; (3) and cross-media notification information for translating the electronic mail message into a paging message to be sent to a paging network and for sending a voice message notification of the electronic message;

said determining step further comprising consulting a distribution list containing a plurality of delivery destinations, each destination having a delivery format of one of a facsimile and an electronic mail format, and responsive to said determining step causing the message to be delivered to the plurality of destinations from the distribution list, the message being routed to each destination in the delivery format prescribed by the distribution list.

* * * * *

UNITED STATES PATENT AND TRADEMARK OFFICE
CERTIFICATE OF CORRECTION

PATENT NO. : 5,742,668
DATED : April 21, 1998
INVENTOR(S) : D.M. Pepe, et al

It is certified that error appears in the above-indentified patent and that said Letters Patent is hereby corrected as shown below:

On the title page, item [54] and Col. 1, line 1, "Massaging" should read -- Messaging --.

Signed and Sealed this

Twenty-third Day of June, 1998

Attest:

BRUCE LEHMAN

*Attesting Officer*  *Commissioner of Patents and Trademarks*